US007926068B2

(12) United States Patent
Sedky et al.

(10) Patent No.: US 7,926,068 B2
(45) Date of Patent: Apr. 12, 2011

(54) PRINTING INTERFACE FOR A COMPUTER PLATFORM

(75) Inventors: Khaled S. Sedky, Sammamish, WA (US); Adina M. Trufinescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1310 days.

(21) Appl. No.: 10/971,685

(22) Filed: Oct. 22, 2004

(65) Prior Publication Data

US 2006/0090172 A1 Apr. 27, 2006

(51) Int. Cl.
*G06F 13/10* (2006.01)

(52) U.S. Cl. ........................................ 719/321; 719/316

(58) Field of Classification Search .................. 358/1.15
See application file for complete search history.

(56) References Cited

U.S. PATENT DOCUMENTS

| | | | | |
|---|---|---|---|---|
| 6,055,063 | A * | 4/2000 | Yang et al. | 358/1.15 |
| 6,598,093 | B1 * | 7/2003 | Schmidt et al. | 719/328 |
| 6,628,413 | B1 * | 9/2003 | Lee | 358/1.15 |
| 7,146,414 | B1 * | 12/2006 | Sievert et al. | 709/223 |
| 7,511,837 | B1 * | 3/2009 | Miyachi et al. | 358/1.15 |
| 2003/0172196 | A1 * | 9/2003 | Hejlsberg et al. | 709/328 |
| 2005/0015498 | A1 * | 1/2005 | Okazawa et al. | 709/227 |

* cited by examiner

*Primary Examiner* — Andy Ho
*Assistant Examiner* — Syed Roni
(74) *Attorney, Agent, or Firm* — Lee & Hayes, PLLC

(57) ABSTRACT

A printing interface provides facilities for handling print server properties, print queues, print commands, printing-related operations, and the like. These facilities allow developers to access and utilize various printing-related information and functions.

25 Claims, 6 Drawing Sheets

PRINTING INTERFACE FOR A COMPUTER PLATFORM

TECHNICAL FIELD

The systems and methods described herein relate to a printing programming model. More particularly, the described systems and methods relate to an interface that facilitates handling of print server properties, print queues, print commands, printing-related operations, and the like.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as various versions of the Microsoft Windows® operating system, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation developed a network software platform known as the ".NET" Framework (read as "Dot Net"). Microsoft® .NET is software for connecting people, information, systems, and devices. The platform allows developers to create Web services that will execute over the Internet. This dynamic shift was accompanied by a set of API functions for Microsoft's .NET™ Framework.

As use of the .NET™ Framework has become increasingly common, ways to increase the efficiency and/or performance of the platform have been identified. The inventors have developed a unique set of API functions to allow for such increased efficiency and/or performance. Particular API functions are related to various printing-related functions that can be targeted against a print server or other component.

SUMMARY

A printing interface provides functions for handling print server properties, print queues, print components, printing-related operations, and the like. These functions allow developers to access and utilize various printing-related information and functions. In one embodiment, the functions allow a developer to interact with a print server or other printing component.

BRIEF DESCRIPTION OF THE DRAWINGS

Similar reference numbers are used throughout the figures to reference like components and/or features.

DETAILED DESCRIPTION

This disclosure addresses an application program interface (API) for a network platform upon which developers can build Web applications and services. More particularly, an exemplary API is described for operating systems that make use of a network platform, such as the .NET™ Framework created by Microsoft Corporation. The .NET™ Framework is a software platform for Web services and Web applications implemented in the distributed computing environment. It represents the next generation of Internet computing, using open communication standards to communicate among loosely coupled Web services that are collaborating to perform a particular task.

Exemplary Network Environment

Figure 1:
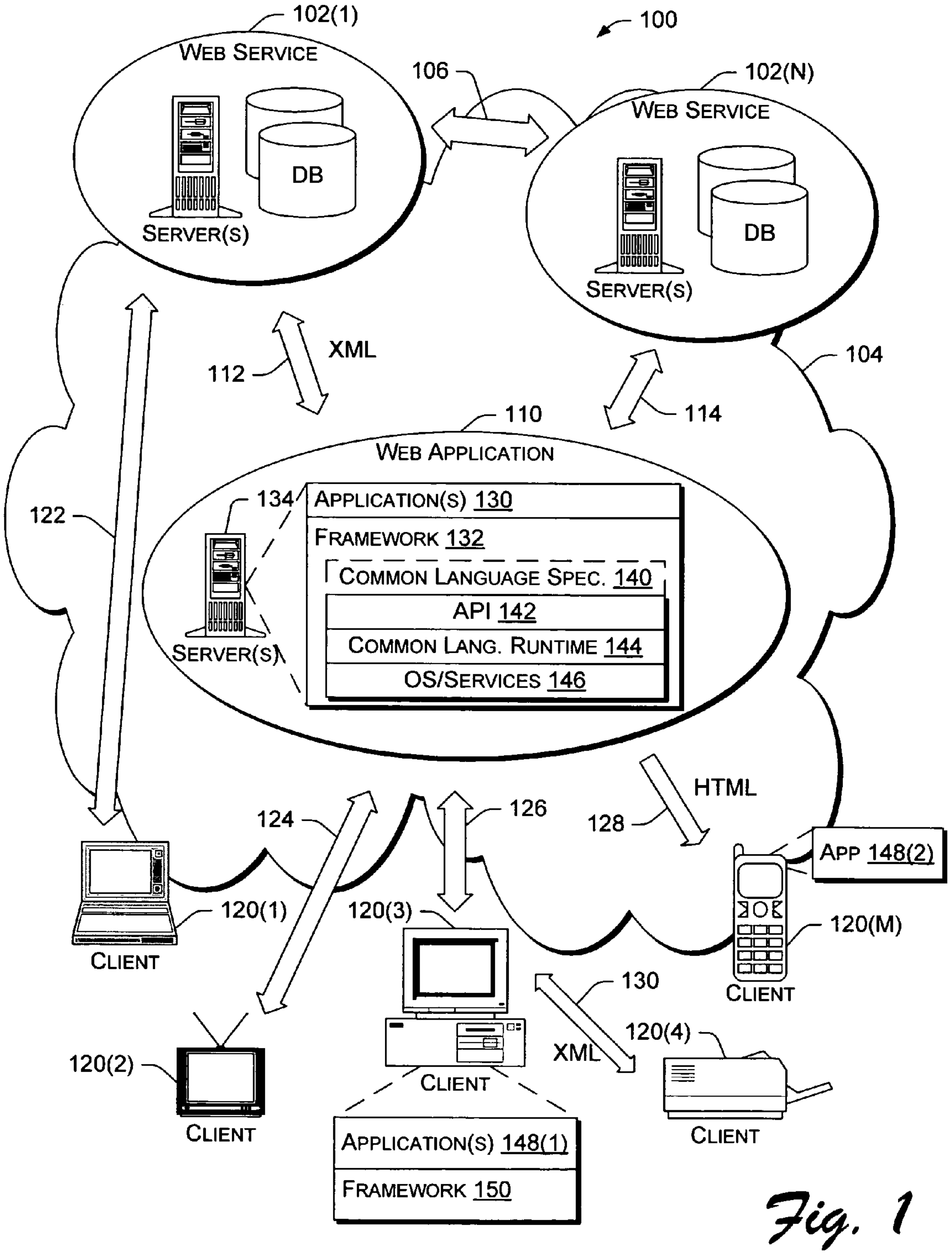
FIG. 1 illustrates an example network architecture in which clients access Web services over the Internet using conventional protocols.

FIG. 1 shows a network environment 100 in which a network platform, such as the .NET™ Framework, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, printing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
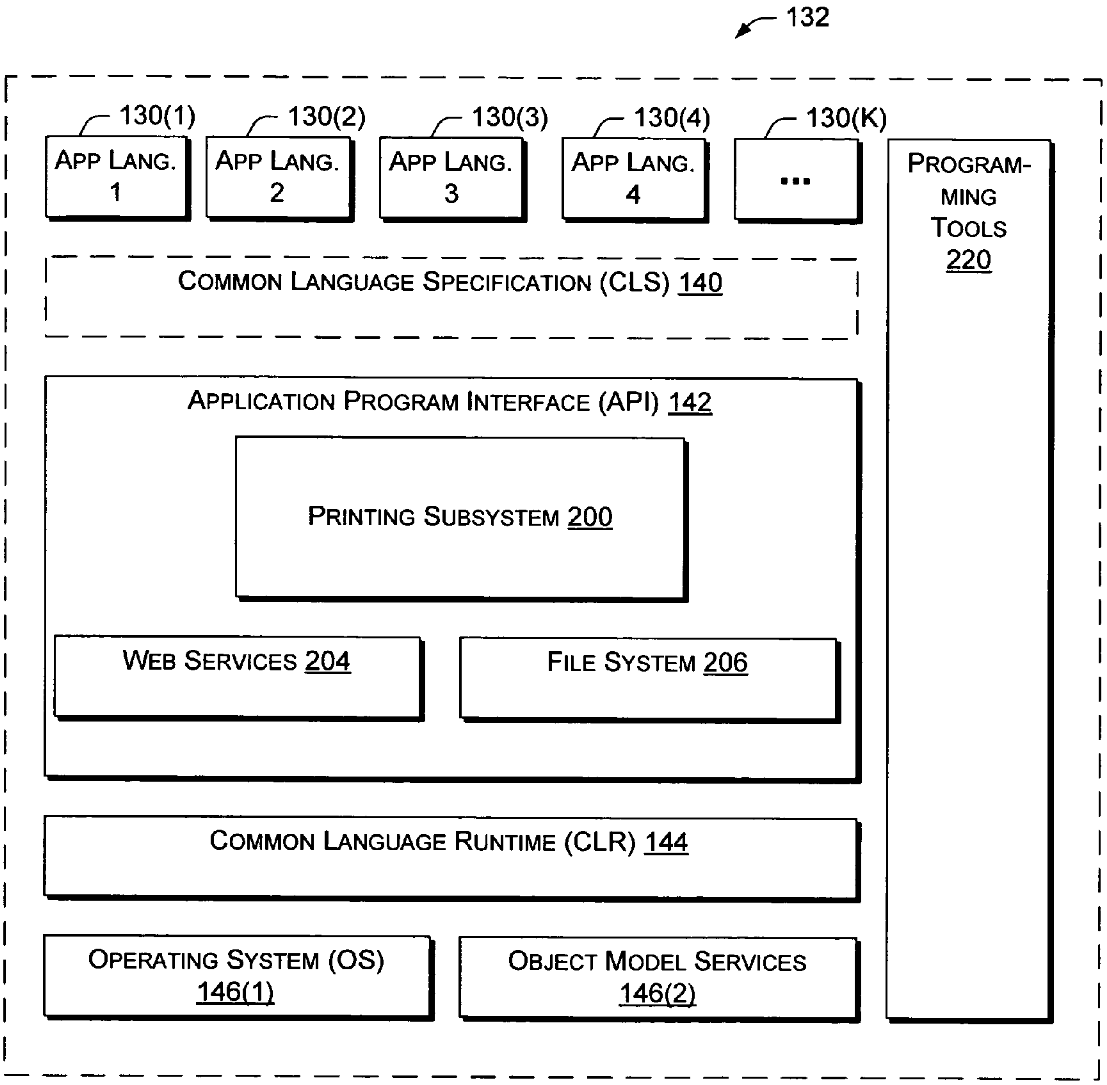
FIG. 2 is a block diagram of an example software architecture for a network platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2006 (Ser. No. 09/598,105) and "Unified Data Type System and Method" filed Jul. 10, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized to include three root namespaces. It should be noted that although only three root namespaces are illustrated in FIG. 2, additional root namespaces may also be included in API 142. The three root namespaces illustrated in API 142 are: a first namespace 200 for a printing subsystem, a second namespace 204 for web services, and a third namespace 206 for a file system. Each group can then be assigned a name. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the file system namespace 206 can be referenced using the hierarchical name "System.Storage". In this way, the individual namespaces 200, 204, and 206 become major branches off of the System namespace and can carry a designation where the individual namespaces are prefixed with a designator, such as a "System." prefix. Similarly, types in the printing subsystem namespace 200 can be referenced using the hierarchical name "System.Printing".

The printing subsystem namespace 200 pertains to various printing-related functions. It supplies types that allow for handling print server properties, print queues, print components, etc. For example, printing subsystem namespace 200 provides a programming model that allows developers to interact with one or more print servers or other print components.

The web services namespace 204 pertains to an infrastructure for enabling creation of a wide variety of applications, e.g. applications as simple as a chat application that operates between two peers on an intranet, and/or as complex as a scalable Web service for millions of users. The described infrastructure is advantageously highly variable in that one need only use those parts that are appropriate to the complexity of a particular solution. The infrastructure provides a foundation for building message-based applications of various scale and complexity. The infrastructure or framework provides APIs for basic messaging, secure messaging, reliable messaging and transacted messaging. In the embodiment described below, the associated APIs have been factored into a hierarchy of namespaces in a manner that has been carefully crafted to balance utility, usability, extensibility and versionability.

The file system namespace 206 pertains to storage. It supplies types that allow for information storage and retrieval.

In addition to the framework 132, programming tools 220 are provided to assist the developer in building Web services and/or applications. One example of the programming tools 220 is Visual Studio™, a multi-language suite of programming tools offered by Microsoft Corporation.

Printing Interface

The exemplary printing interface described herein is an object-oriented printing API set that has the ability to express the properties of various printing components as type safe, attribute-value pair objects. The attribute-value properties are associated with printing managed objects through the means of collection objects. Thus, the set of properties that a given print object supports is extensible at run time and not dependent on the print server's OS version (which dictates the supported set of a print object's properties). As used herein, the terms "printing interface" and "printing programming model" are used interchangeably.

In one embodiment, the namespaces are identified according to a hierarchical naming convention in which strings of names are concatenated with periods. For instance, the printing subsystem namespace 200 is identified by the root name "System.Printing". Within the "System.Printing" namespace are other namespaces, identified as "System.Printing.PrintSubSystem" and "System.Printing.Configuration".

Figure 3:
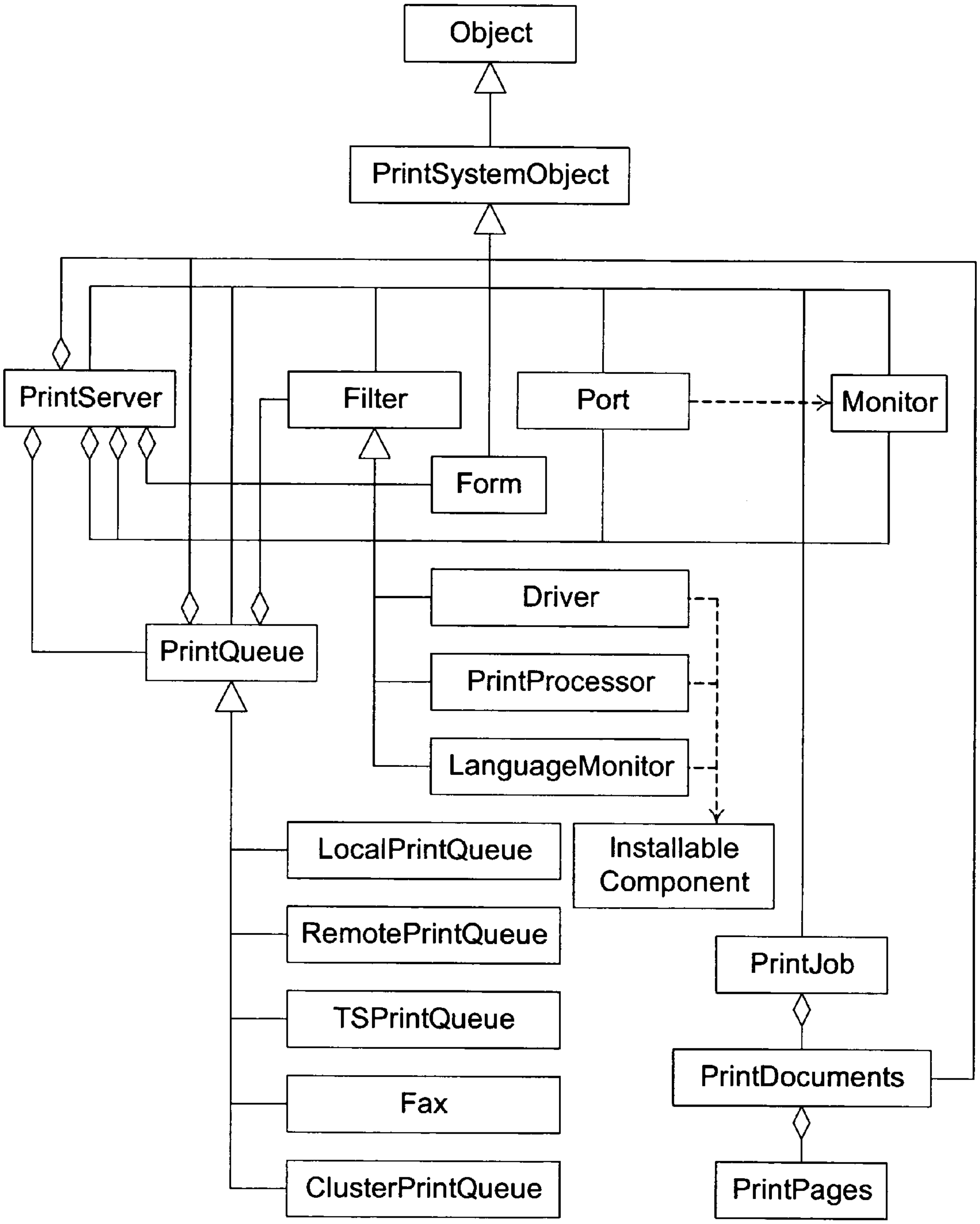
FIG. 3 illustrates an example object diagram of managed printing objects that support the API.

FIG. 3 illustrates an example object diagram of managed printing objects that support the API. "PrintSystemObject" is a base class from which other printing classes may inherit. "PrintSystemObject" inherits from "System::Object" and this class would be the base for all classes instantiated on the client as a proxy of an object hosted by the spooler. The following is an example code portion that illustrates the class.

```
__gc public __abstract class PrintSystemObject
{
    public:
    __delegate
    PrintSystemObject*
    CreateObject(
        String*
        );
    __delegate
    PrintSystemObject*
    Create(Install)Object(
        String*,
        Object*[ ]
        );
    PrintSystemObject(
        void
        );
    ~PrintSystemObject(
        void
        );
    __property
    PrintSystemAttributeValueCollection*
    get__Collection(
        void
        );
    __property
    void
    set__Collection(
        PrintSystemAttributeValueCollection*
        );
    void
    Commit(
          void
          );
    protected:
    void
    WriteOnCommit(
        void
        );
    private:
    PrintSystemAttributeValueCollection* collection;
};
```

As seen in the above code portion, the Attribute Value collection is an important property for extensibility and should be defined by the base class. The Attribute Value collection is later filled in by the inheriting classes.

Many of the operations in the print spooler architecture depend on binding to a certain provider and applying operations on a certain container in that provider. This container on the spooler side is called the "Spooler" and on the client side is called the "PrintServer". Many of the administrative tasks such as adding printers, monitors, print processors, and the like depend on such an entity.

Figure 4:
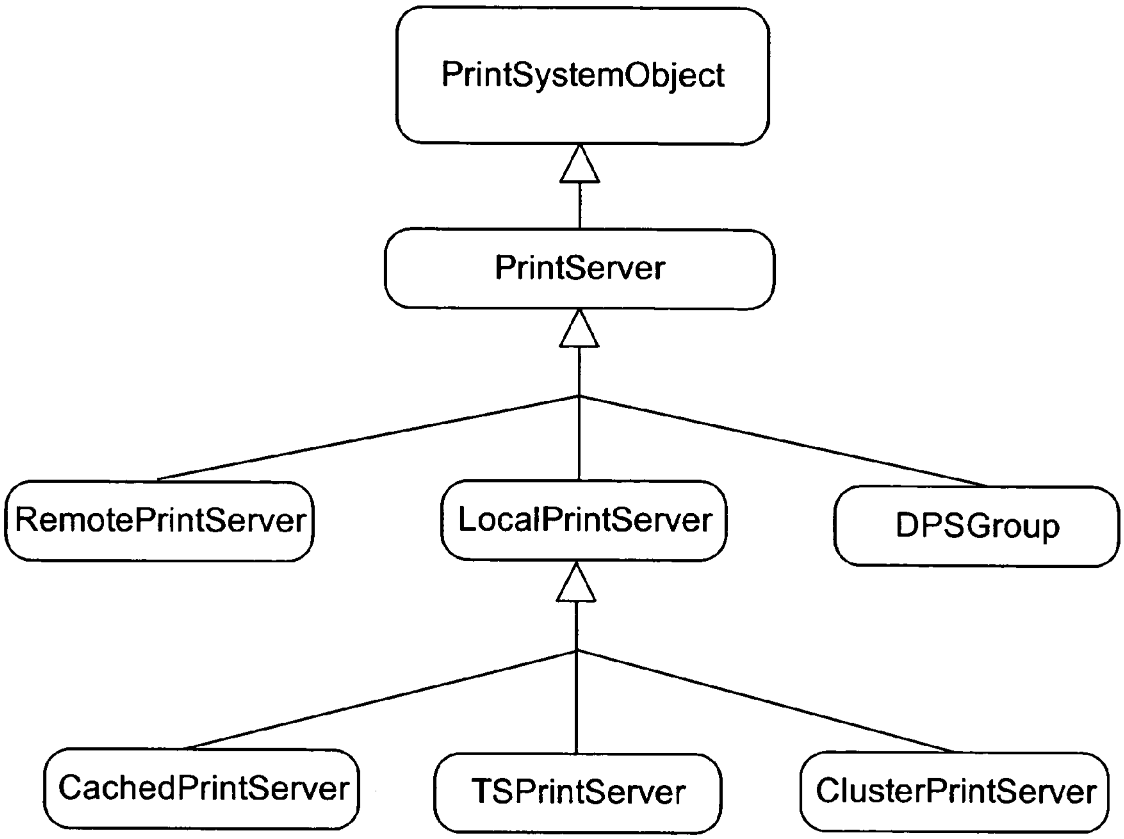
FIG. 4 shows an example class hierarchy for "PrintServer".

FIG. 4 shows an example class hierarchy for "PrintServer". FIG. 4 shows various server types that may interact with "PrintServer". Some operations may differ from one server type to another. For example, adding an object locally is different than adding an object to a clustering environment or to a DPS Group.

A proposed signature for adding generic objects to the PrintServer class is as follows:

```
PrintSystemObject*
PrintServer::
Create(Install)Object(
   Type*                                       objType,
   PrintSystemAttributeValueCollection* attributeCollection
   );
```

PrintSystemObject* above is for illustrative purposes and in the implementation and the header files, the objType would be implicit by and replaced by the object implementing this method (such as PrintQueue, Filter, etc.). The attributeCollection would follow the most common constructor parameters for the object at hand.

In this example, the PrintServer would realize what objects can be created underneath it. Each object created within the PrintServer is delegated its creation. If an attempt is made to create an object of type "Unknown" to the PrintServer, its creation would fail. Thus, to either install a PrintQueue on a PrintServer the following methods are used:

```
PrintQueue*
PrintServer::
Create(Install)PrintQueue(
     String*                          printQueueName,
     DriverIdentifier*                driverID,
     Ports*                           ports,
     PrintQueueAttributes             printerAttributes,
     UInt32                           requiredPriority,
     UInt32                           requiredDefaultPriority,
     PrintSystemObjectCreationType    creationType
     );
PrintQueue*
PrintServer::
Create(Install)PrintQueue (
     String*                          printQueueName,
     DriverIdentifier*                driverID,
     Ports*                           ports,
     PrintQueueAttributes             printerAttributes,
     UInt32                           requiredPriority,
     UInt32                           requiredDefaultPriority,
     PrintQueueStringProperty*        requiredPrintQueueProperty,
     PrintSystemObjectCreationType    creationType
     );
```

This is a subset of the methods available for printer creation from a print server. In one embodiment, the most common creation APIs are added to the list of Creation APIs. The remaining creation APIs are extended through use of the Attribute/Value pair paradigm.

For any AttributeValue inheriting from PrintSystemAttributeValue, a delegate is added which links a property to the AttributeValue. For example, with respect to the PrintSystemStringAttributeValue:

```
__gc public class PrintSystemStringAttributeValue :
public PrintSystemAttributeValue
{
     public:
     //
     // This is a delegate signature that would be used
     // by a Property later on to link this AttributeValue
     // to that property
     //
     __delegate
     void
     SetString(
          String*
          );
     __property
     SetString*
     get__Link(
            void
            );
     private:
     SetString*    link;
};
```

When the Value of an instance of this class is being updated, code such as the following would be running:

```
void
PrintSystemStringAttributeValue::
set__Value(
   Object* InValue
   )
{
   Type* InType = InValue→GetType( );
   if( InType == __typeof(String))
   {
      value = new String(__try__cast<String*>(InValue)→ToCharArray( ));
      //
      // Code stripped where a check is done to make sure that the
      // AttributeValue is dirty before updating. Reason to prevent
      // infinite loop in property update
      //
      if(link)
      {
         //
         // This links the attribute value to a property
         //
         link→Invoke(value);
      }
   }
}
```

In any Class using the AttributeValue approach and using an example Object1:

```
__gc public class Object1 :
public PrintSystemObject
{
      Object1(
            void
            );
      __property
      void
      set__Name(
            String*
            );
      __property
      String*
      get__Name(
            void
            );
      __event
      OnStringChanged* onNameChanged;
      private:
      String* Name;
};
```

In the constructor of Object1, the following example code could be implemented:

```
      __try__cast<PrintSystemStringAttributeValue*>(pSF1)→Link =
      new
PrintSystemStringAttributeValue::SetString(this,&Object1::set__Name);
```

What this means is that when the Value of an AttributeValue with name="Name" is updated, the corresponding property name would also be updated. Thus, a link between the property and the AttributeValue is established.

With respect to the above code portion, the following would be defined elsewhere:

```
__delegate void OnStringChanged(String*)
OR
__delegate void OnStringChanged(Object* sender, StringEventArgs* e)
```

-continued

```
where
__gc public class StringEventArgs : public EventArgs
{
      public:
      StringEventArgs(String* newName);
      __property
      get__Name(
            void
            );
      private:
      String* name;
};
```

The difference between the above two delegates is that the first is very specific because it is coming from a known object that was registered against. The second delegate could come from multiple objects and the consumer of the notification needs to determine which object.

As mentioned previously, the AttributeValue is important for extensibility and the Property is important for primitive languages like VB (Visual Basic) and tools like intellisense. So, based on this, the rule for Classes created for the PrintSystem is to implement both a property (which is the primary way of accessing the object state) and an AttributeValue for each property expressed by the class. Those two are linked together.

Thus, each Class would be exposing two ways for accessing its properties. The first is through the Property Collection which accesses the attribute based on its name, and the second would be through the Getters and Setters of the properties.

For example, assuming that the PrintServer class has a property named DefaultSpoolDirectory, there are two ways to set this property given that we have the PrintServer object instance:

PrintServer→DefaultSpoolDirectory=S"\\DFSShare\SpoolFiles";
OR
PrintServer→Coll["DefaultSpoolDirectory"]=S"\\DFSShare\SpoolFiles";

These two methods are linked internally and using one would potentially update the other.

The "Set" operation which accesses a remote process (even if it is the local spooler) is considered an expensive operation. Thus, it is recommended to batch the Set operations. In one embodiment, all Set operations are cached on the client object until the client explicitly commits the data. The Commit method would potentially flush the Set properties from the client property cache and update the server process. This construct is equally useful with other class types other than the PrintServer. For example:

PrintServer→DefaultSpoolDirectory=S"\\DFSShare\SpoolFiles";
PrintServer→BeepEnabled=1;
PrintServer→PortThreadPriority=1;
PrintServer→Commit( );

The following is a set of properties that the PrintServer may expose:

```
__property Path*      defaultSpoolDirectory;
__property Int32      portThreadPriority;
__property Int32      defaultPortThreadPriority;
__property Int32      schedularPriority;
__property Int32      defaultSchedulerPriority;
__property Int32      beepEnabled;
__property Int32      netPopUp;
__property Int32      eventLog;
__property Int32      majorVersion;
__property Int32      minorVersion;
```

-continued

```
__property Int32              restartJobOnPoolError;
__property Int32              restartJobOnPoolEnabled;
__property DriverStorage*     driverStorage;
__property SByte              osVersion;
```

All of the above properties would be defined as managed properties. The explicit Get methods would be replaced by constructors on the specific object types.

In the sample code portions shown above, it is possible to replace String*[ ] with a predefined Enum Filter type that could be defined as:

```
__value enum Printer::Filters
{
    printqueuename,
    location,
    comment,
    driver
};
```

Internally in the objects, once an enumeration is received, a process can call:

```
String* LocStr = __box(Printer::location)->ToString( ) and get
the required property to populate.
```

A method is provided for retrieving any list (or collection) of objects of a specified type as well as specific methods to retrieve the most commonly used types like Printers, Jobs and Drivers. These methods have a signature such as:

```
PrintSystemObjects*
PrintServer::
GetObjects(
    Type*
    String*[ ]
    );
```

Other methods have signatures such as:

```
PrinterQueues*
PrintServer::
GetPrinterQueues(
    void
    );
OR
PrintQueues*
PrintServer::
GetPrinterQueues(
    String*[ ]
    );
```

where the former would retrieve the defined set of properties/printer and the later would populate Printers with all properties.

Figure 5:
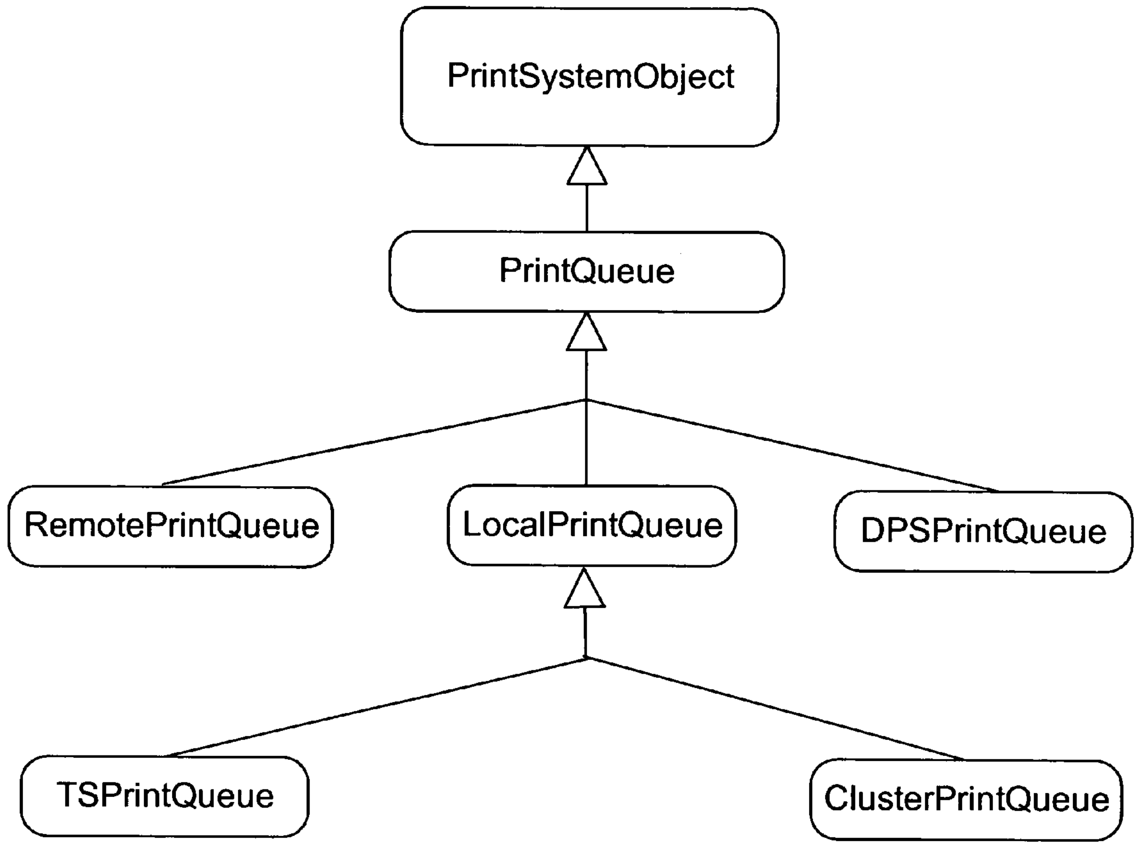
FIG. 5 shows an example class hierarchy for "PrintQueue".

FIG. 5 shows an example class hierarchy for "PrintQueue" and shows multiple printer types that are handled by the spooler. Certain operations may differ from one printer type to another. For example, in DPS a printer is not tied to a server, but instead is tied to a group of servers. The DPSPrinter class instantiation contains this knowledge. The DPSPrinter class also knows how to bind to the correct server and what it needs to do if the server fails. Also, certain printers could be participating in a load balance scheme which might require them to be more intelligent then other local printers.

In the managed implementation, there is no direct call to OpenPrinter. There are many events that could lead to instantiating a PrintQueue. Some of those events could lead to internally opening a PrintQueue and others could just populate a PrintQueue object from a server side enumerated data without really opening a PrintQueue. An example of the latter situation happens with enumerating printers which could instantiate printers on the client without really doing OpenPrinter on the server.

When creating a PrintQueue, one or more static methods on the PrintQueue allow the system to create the PrintQueue with the most commonly used initialization parameters. Also, the system could add an extra static method which would enable generic instantiation by using an Attribute/Value collection. The following code portions illustrate examples of these methods:

```
Static
PrintQueue*
PrintQueue::
Create(
        PrintServer* printServer,
        String*          name,
        ...
        );
and
Static
PrintQueue*
PrintQueue::
Create(
        PrintServer*                            printServer,
         String*                                        name,
        PrintSystemAttributeValueCollection*    attribCol
        );
```

The following code portions show creating the PrintQueue through the constructor directly:

```
PrintQueue* printQueue = new PrintQueue(Name)
PrintQueue* printQueue = new PrintQueue(Name,
                                strArray[ ]);
```

Another group of objects are adding/deleting objects pertinent to a printer, such as Forms and Jobs. Example APIs include AddForm, DeleteForm, and AddJob. Example signatures include:

```
PrintSystemObject*
PrinterQueue::
CreateObject(
    Type*                           objType,
    PrintSystemAttributeValueCollection* attributeCollection
    );
void
PrinterQueue::
DeleteObject(
  Type*      objType
  String*    objName
  );
```

In this example, the PrintQueue would realize what objects can be created underneath the PrintQueue. In this example, each object created within the Printer is delegated its creation. So, if someone tries to create an object of type (Unknown) to the printer, its creation would fail.

In one embodiment, to support simpler usage, the most common embedded object (such as a Job) would have its own creation function:

```
PrintingJob*
PrinterQueue::
CreateJob(
    PrintSystemAttributeValueCollection* attributeCollection
    );
PrintingJob*
PrinterQueue::
CreateJob(
    //
    // The most common parameters for creating (adding) a job
    //
    );
```

Another group of APIs are used to Get/Set data on a Printer.

The Printer exposes two ways for accessing its properties. The first is through the Property Collection which access the attribute based on its name and the second would be through the Getters and Setters (Accessor and Mutator) of the individual property.

For example, assuming the Printer class has a property named ShareName. There are two ways to set this property given that we have the Printer object instance:

PrintQueue→ShareName=S"\\DFSShare\SpoolFiles";

OR

PrintQueue→Coll["ShareName"]=S"Building__2_Printer";

Changes are cached in the client proxy until an explicit commit takes place. For example:

PrintQueue→Coll["ShareName"]=S"Building__2_Printer";

PrintQueue→SecurityDescriptor={ . . . };

PrintQueue→Comment=S"This is building main mass printing device";

PrintQueue→Commit( );

The Printer object exposes two Job Tickets to the consumer application. Although there are three Job Tickets (i.e., DefaultPrinterJobTicket, UserJobTicket, and DefaultDeviceJobTicket), only the first two would be exposed through the Printer object while the latter would be exposed through the Driver object.

Job Tickets are exposed to the application as a Stream. The application could convert the Stream to an XML document, process it and either set a new Job Ticket or do whatever fits the work flow by that time. Later, when a consumer wants to use a Job Ticket, the consumer implements one of the following:

Job Ticket* DefaultJobTicket=printQueue→DefaultJobTicket; OR

JobTicket* DefaultJobTicket=printQueue→Col["DefaultjobTicket"];

The spooler objects act as a gateway between application requests and the Job Ticket Manager. Some of those APIs deal with the device capabilities, while others deal with the Job Tickets and their validation. The APIs which are gated through the Printer Object include: JobTicketManager::GetDeviceCapabilities, JobTicketManager::MergeAndValidateJobTicket, and JobTicketManager::FilterJobTicketWithNamespaces.

The Printer Object has a JobTicketManager instance to be instantiated and used on demand, such as: JobTicketManager* JTM; and has the following method signatures:

```
Stream*
PrintQueue::
AcquireDeviceCapabilities(
        Stream*                 jobTicket,
        DeviceCapFeatureSet     featureSet
        );
Stream*
PrintQueue::
MergeAndValidateJobTicket(
        Stream*                        basejobTicket,
        Stream*                        deltaJobTicket,
        JobTicketValidationResult**    result
        );
```

Another group of APIs are used to query/set/enumerate and delete data on a PrintQueue. This group of APIs can be separated into two different sets of APIs:

1. A first set that deals with defining properties corresponding to whatever we have defined in the INFO_LEVELS. A consumer could set/query those properties by calling the getters and setters on the properties. This approach would also build a property cache behind the scenes and this cache would be flushed form the pipeline based on some explicit API call.

2. The second set involves using the attribute collection, such as filling the collection of attributes/values with all the properties that need to be queried or set.

Various properties may be defined as follows:

```
__property Int32                               priority;
__property Int32                               defaultPriority;
__property Int32                               startTime;
__property Int32                               untilTime;
__property Int32                               averagePPM;
__property String*                             shareName;
__property String*                             comment;
__property String*                             location;
__property Path*                               sepFile;
__property Stream*                             userJobTicket;
__property Stream*                             defaultJobTicket;
__property PrintQueueAttributes                attributes;
__property PrintQueueStatus                    status;
__property PrintSubSystem::Ports*              queuePorts;
__property PrintSubSystem::Driver*             queueDriver;
__property PrintSubSystem::PrintProcessor*     queuePrintProcessor;
__property PrintSubSystem::PrintServer*        hostingPrintServer;
__property JTM*                                jobTicketManager;
```

```
//
// The following set of boolean properties represent
// the status of the PrintQueue
//
```

```
__property bool       isPaused;
__property bool       isInError;
__property bool       isPendingDeletion;
__property bool       isPaperJamed;
__property bool       isOutOfPaper;
__propertybool        isManualFeedRequired;
__property bool       hasPaperProblem;
__property bool       isOffline;
__property bool       isIOActive;
__property bool       isBusy;
__property bool       isPrinting;
__property bool       isOutputBinFull;
__property bool       isNotAvailable;
```

-continued

```
__property bool         isWaiting;
__property bool         isProcessing;
__property bool         isInitializing;
__property bool         isWarmingUP;
__property bool         isTonerLow;
__property bool         hasNoToner;
__property bool         doPagePunt;
__property bool         needUserIntervention;
__property bool         isOutOfMemory;
__property bool         isDoorOpened;
__property bool         isServerUnknown;
__property bool         isPowerSaveOn;
```

and correspondingly we would have the getters and setters in the following form:

```
String*
PrinterQueue::
get__Name(
   void
   );
void
PrinterQueue::
set__Name(
     String*
     );
Driver*
PrintQueue::
get__QueueDriver(
       void
       );
void
PrintQueue::
set__QueueDriver(
       Driver*
       );
```

For properties that cannot be expressed in the above form, the following methods may be used:

```
bool
PrintQueue::
Pause(
   void
   );
bool
PrintQueue::
Resume(
       void
       );
bool
PrintQueue::
Purge(
     void
     );
```

For enumerations, the following methods are used:

```
PrintSystemObjects*
PrintQueue::
GetObjects(
      Type*
      String*[ ]
   );
PrintingJobs*
PrintQueue::
GetJobs(
     void
     );
```

Another group of APIs are used in getting an object contained logically within a printer. Some objects need activation, while others are data objects that do not require activation. For example:

```
PrintingJob*
PrintQueue::
GetJob(
     String*          jobName (or more realistically a JobID)
);
```

and an example of how this could be consumed:

```
PrinterQueue*    printerQueue      = NULL;
PrintQueueKey    printQueueKey     = NULL;
printQueue = printServer->GetPrinter(L"local");
```

The client can subscribe to notifications regarding any changes that occur for the corresponding object on the server. Those changes could be generally triggered by this client object or by any other client object in the same or in a different application domain or process. The client will receive a notification when properties change on the object.

On the PrintSystemObject, the system can publish an event which would be subscribed against by those clients, as shown in the code below. Additionally, an event could be published that would potentially summarize many changes in an object instead of one property at a time.

Defining the event:

```
__gc public __abstract class PrintSystemObject :
public Object, public IDisposable
{
     public:
          __event
          void
          OnPropertyChangedHandler(
               PrintSystemObject*,
                PrintSystemObjectPropertyChangedEventArgs*
               );
          __event
          void
          OnPropertiesChangedHandler(
               PrintSystemObject*,
                PrintSystemObjectPropertiesChangedEventArgs*
               );
            void
            SetPropertiesToTrackForChanges(
                String*[ ]
                );
...
     protected:
           virtual
          void
           OnPropertiesChanged(
               PrintSystemObjectPropertiesChangedEventArgs* e
               );
           virtual
          void
           OnPropertyChanged(
               PrintSystemObjectPropertyChangedEventArgs* e
               );
};
```

The subscriber will subscribe to this event as shown below:

```
Driver* driver = new driver (S"MS Print Driver", RetrieveInstance);
driver-> OnPropertyChangedHandler +=
new PrintSystemObject:: OnPropertyChangedHandler (
      NULL,
      &ClientClass::NotifyMeOnPropertyChanges);
```

When one or more properties of the object are changed, the chained delegates are fired and provided the pointer to the object that fired the event as well as the event data. For the event data, the system defines both the PrintSystemObjectPropertyChangedEventArgs and PrintSystemObjectPropertiesChangedEventArgs classes which inherit from EventArgs. Both classes have read-only properties that indicate the property that changed or a collection of changed attribute/value pairs, when applicable.

Properties of PrintSystemObjectProperty(ies)ChangedEventArgs:

```
__property
String*
get__PropertyIndex(
      void
      );
OR
__property
String[ ]*
get__ChangedProperties(
            void
            );
```

Various User Interface (UI) classes are discussed below. When using these UI classes, the common print dialog and page setup dialog will reside in the Shell namespace and will inherit from class CommonDialog. For example:

```
typedef __gc struct SPRINTPAGERANGE
{
      Int32 PageFrom;
      Int32 PageTo;
} PrintPageRange,
gc __enum PageSelection
{
      Selection      = 1,
      CurrentPage    = 2,
      Pages          = 4
All = Selection | CurrentPage | Pages
}.
public __gc class PrintDialog:
public CommonDialog
    {
```

Table 1 below illustrates various UI classes.

TABLE 1

| | |
|---|---|
| HidePrintToFile | Get or set a value indicating if the Print to file check box is hided |
| AllowPrintToFile | Get or set a value indicating if the Print to file check box is enabled |
| AllowSelection | Get or set a value indicating if the From... To... Page option button is enabled |
| AllowCurrentPage | Get or set a value indicating if the Current Pages option button is enabled |
| AllowSomePages | Get or set a value indicating if the Pages option button is enabled |

TABLE 1-continued

| | |
|---|---|
| AppHandlesCopiesAndCollate | Set a value indicating if the app will handle copies and collate. |
| Copies | Get or set a value indicating the number of copies that the app needs to handle, if AppHandlesCopiesAndCollate is false, this value will always be one since the print processor will deal with it automatically |
| DoCollate | Get or set a value indicating if the collate check box is checked, if AppHandlesCopiesAndCollate is false, this value will always be FALSE since the print processor will deal with it automatically |
| PrintToFile | Get or set a value indicating if the Print to file check box is checked |
| MinPage | Set the minimum value for the FromPage or ToPage that can be selected in a common print dialog |
| MaxPage | Set the maximum value for the FromPage or ToPage that can be selected in a common print dialog |
| PageSelection | Get and set a value indicating the current user selection |
| PageRanges | Get and set an array indicating the page ranges entered by the user |
| JobTicket | Get and set the printer job ticket info for printing the document |
| ShowDialog( ) | Display the print dialog |

```
__gc Enum MeasureUnit
{
      kLocaleDefault = 0,
      kInInch        = 1,
      kInMillimeter = 2
};
```

Another group of APIs are used for installing installable components on the PrintServer: AddMonitor, AddPrintProvider, AddPort, AddDriver, and AddPrintProcessor.

To create an installable component on the PrintServer (e.g., Drivers, Filters, Print Processors, and Language Monitors), the following example methods may be used:

```
Filter*
PrintServer::
Create(Install)Filter(
      Type*       filterType,
      String*     filterName,
      String*     infName,
      Path*       installRoot
      );
```

and we also supply the very specific methods

```
Driver*
PrintServer::
CreateDriver
      String*     filterName,
      String*     infName,
      Path*       installRoot
      );
```

and so on for the rest of the objects that could be created.

The following is a proposed signature for deleting generic objects from the PrintServer class:

```
void
PrintServer::
DeleteObject(
    Type*    objType,
    String*    objName
    );
```

or the system may directly reference the methods corresponding to deleting certain object types, resulting in signatures of the type:

```
void
PrintServer::
DeleteXXXX(
  String*    objName
  );
```

where XXXX is replaced by "Driver", "Filter", "PrintProcessor", etc.

A Driver is associated with a print server. When a Driver object is created, by default it is associated with a PrintServer object. When creating a Driver, the system uses a set of static method(s) that allow creation of a Driver with the most commonly used initialization parameters. Additional static methods can be added to enable generic instantiation through utilizing an Attribute/Value collection. The following code portions show an example of those static methods:

```
Static
Driver*
Driver::
Create(
    PrintServer* printServer,
    String* name,
    ...
    );
and
Static
Driver*
Driver::
Create(
    PrintServer*                              printServer,
    String*                                   name,
    PrintSystemAttributeValueCollection*      attribCol
    );
```

Other alternatives are available to installing the Driver. One of those alternatives is to use the constructor of the Driver directly. In one embodiment, there are no reasonable defaults for the initialization parameters. Thus, the consumer supplies the initialization parameters for creation.

The code portion below illustrates creation of the Driver through the constructor. Note that initialization parameters are supplied. Among these parameters are the driver installation flags such as StrictUpgrade, etc.

```
PrintSystemAttributeValueCollection attrbcol =
new PrintSystemAttributeValueCollection;
//
// Some code runs here to initialize the collection with all required
// AttributeValues.
```

-continued

```
//
Driver* driver = new driver (printServer,
                CreateAndRetrieveInstance, //TBD
            attrbcol);
```

Another way to create a Driver object with the constructor is shown below:

Driver* driver=new Driver (Path, Name, someDefaults);

Retrieving a filter (or driver) is similar to creating the driver, with the difference that the object is instructed to not create a new object on the server side, but to look for an existing one and initialize a copy of data on the client. Printer drivers with the same name but different versions can exist on a print server. If no version is specified, the Get method will look for the driver with the highest version installed on the print system. The following code portion shows how this can be done through the constructor:

```
Driver* driver = new driver (Name);
and with initialization parameters.
Driver* driver = new driver (Name,
            attrbcol);
```

Deletion of a driver happens at the PrintServer level. The deletion of the Driver object implies only releasing the client resources, as opposed to deleting the printer driver. To delete a print driver, the DeleteObject method on the PrintServer object is called. The DeleteObject method of the PrintServer class allows specifying a PrintSystemAttributeValueCollection. This collection allows for identification of the deletion preferences, such as version and file deletion. If the PrintSystemAttributeValueCollection doesn't mention a version or the manner in which the files are to be deleted, then the deletion will match the behavior of DeletePrinterDriver. Below is an example of how driver deletion can be achieved. The code portion assumes that there are no printer objects using the driver.

```
PrintServer * printServer =
new PrintServer(Path);
PrintSystemAttributeValueCollection attrbcol =
new PrintSystemAttributeValueCollection;
//
// Some code runs here to initialize the collection with all required
// AttributeValues.
//
printServer->DeleteDriver(attrbcol);
```

Another method with more specific parameters is available to delete the driver from the parent object.

printServer→DeleteDriver(name);

An example of enumerating the Driver objects associated with a PrintServer object is shown below.

```
Drivers* drivers=
PrintServer->GetDrivers(new String*[] = {S"DriverName" })
IEnumerator* enum = drivers→GetEnumerator( );
for(;enum->MoveNext( );)
{
  String*   property1   =   (__try_cast<Driver*>(enum->Current))→
DriverName;
}
```

-continued

```
The C# code would look like this.
foreach(Driver driver in printServer.
            GetObjectEnumerator(new          String[ ]          =
{S"DriverName"})
  {
        String .driverName = driver.DriverName;
  }
```

Various Driver properties are defined below.

_property [ReadOnly] String* DriverName;
_property [ReadOnly] String* PrintServerName;
_property [ReadOnly] Queue* PreviousNames;
_property [ReadOnly] Int32 OperatingSystemVersion;
_property [ReadOnly] String* Environment;
_property [ReadOnly] Path* DriverFile;
_property [ReadOnly] Path* ConfigFile;
_property [ReadOnly] Path* DataFile;
_property [ReadOnly] Path* HelpFile;
_property [ReadOnly] Queue* DependentFiles;
_property [ReadOnly] String* LanguageMonitor;
_property [ReadOnly] String* DefaultDataType;
_property [ReadOnly] DateTime DriverDateTime;
_property [ReadOnly] Int64 DriverVersion;
_property [ReadOnly] String* Manufacturer;
_property [ReadOnly] String* Provider;
_property [ReadOnly] String* HardwareId;
_property [ReadOnly] String* OemUrl;
_property [ReadOnly] PrintSystemDriverInstallationType installationType;

In one embodiment, the Driver object doesn't support Set operations on the properties. A change in any property results in a new printer driver object possibly created on the server. The following method can be used to apply those changes:

```
bool
Driver::
Upgrade(
   PrintSystemAttributeValueCollection*,
   PrintSystemDriverInstallationType
   );
```

The driver installation types are defined as follows.

[FlagsAttribute]

_value enum PrintSystemDriverInstallationType

```
{
   StrictUpgrade          = 0x00000001,
   StrinctDowngrade       = 0x00000002,
   CopyAllFiles           = 0x00000004,
   CopyNewFiles           = 0x00000008,
   CopyFromDirectory      = 0x00000010,
   InstallWarnedDriver    = 0x00008000,
};
```

The driver deletion types are defined as follows.

[FlagsAttribute]

_value enum PrintSystemDriverDeletionType

```
{
  DeleteUnusedFiles       = 0x00000001,
  DeleteSpecificVersion   = 0x00000002,
  DeleteAllFiles          = 0x00000004,
};
```

For each of these values, AttributeValues classes will be added.

PrintSystemDriverDeletionTypeAttributeValue

PrintSystemDriverInstallationTypeAttributeValue

Figure 6:
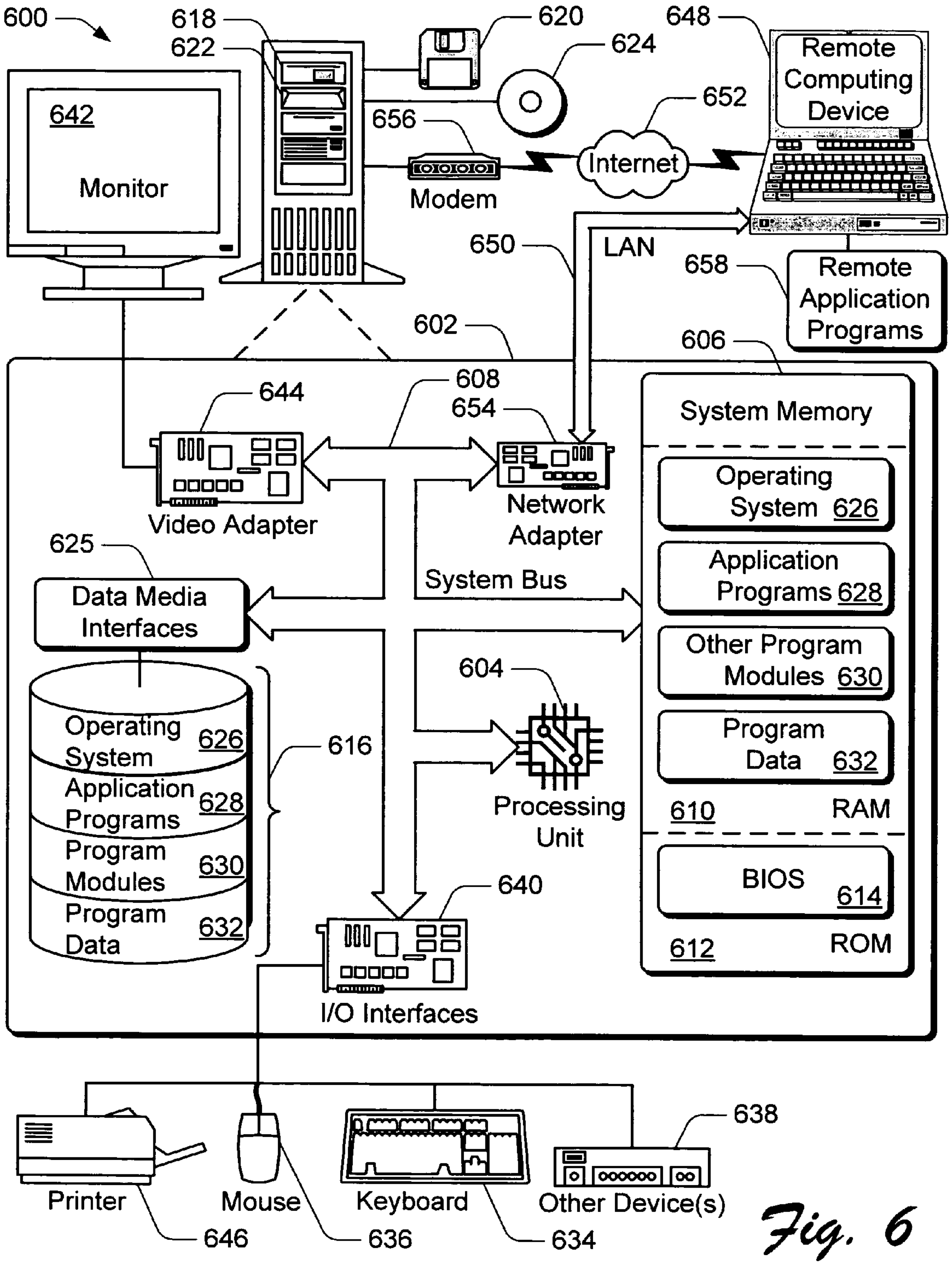
FIG. 6 is a block diagram of an exemplary computer that may execute all or part of the software architecture.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604 (optionally including a cryptographic processor or co-processor), a system memory 606, and a system bus 608 that couples various system components including the processor 604 to the system memory 606.

The system bus 608 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The following listing represents an example set of APIs. This information covers an example set of classes available to an end user to interact with Print Servers, Printers, Drivers, Ports, and the like, in addition to various classes that secure those objects. The APIs discussed herein relate to various functions, such as end user printing functions and management functions. In one embodiment, the two primary namespaces are System.Printing.PrintSubSystem and System.Printing.Configuration.

PrintSystemObject

Definition public abstract class PrintSystemObject: IDisposable

Namespace: System.Printing.PrintSubsystem
Assembly: System.Printing

Header File: PrintSystemObject.hpp

Events

PrintSystemObject.OnPropertiesChanged Event

Implements the PropertiesChanged delegate that is being fired when one or more properties in the attribute value collection change.

*Definition*

```
protected virtual void OnPropertiesChanged (
    PrintSystemObject sender,
    PrintSystemObjectPropertiesChangedEventArgs   e
);
```

*Parameters*

PrintSystemObject sender,

PrintSystemObjectPropertiesChangedEventArgs e

*Remarks*

None

*Return Value*

None

*Exceptions*

PrintSystemObject.OnPropertyChanged Event

Implements the PropertyChanged delegate that is being fired when one property in the attribute value collection change.

*Definition*

```
protected virtual void OnPropertyChanged(
    PrintSystemObject sender,
    PrintSystemObjectPropertyChangedEventArgs e
);
```

*Parameters*

PrintSystemObject sender,

PrintSystemObjectPropertyChangedEventArgs e

*Remarks*

None

*Return Value*

None

*Exceptions*

Constructors

PrintSystemObject.PrintSystemObject

Initializes the base class PrintSystemObject

*Definition*

```
protected PrintSystemObject (
    void
);
```

*Parameters*

None

*Remarks*

*Return Value*

*Exceptions*

Methods

PrintSystemObject.BaseAttributeNames Method

Returns the names of attributes covered by this class.

*Definition*

```
protected static String* BaseAttributeNames (
    void
) [];
```

*Parameters*

None

*Remarks*

None

*Return Value*

*Exceptions*

PrintSystemObject.BaseAttributeTypes Method

Returns the types of attributes covered by this class.

*Definition*

```
protected static Type[] BaseAttributeTypes (
    void
);
```

*Parameters*

None

*Remarks*

None

*Return Value*

*Exceptions*

PrintSystemObject.Initialize Method

Initializes the attribute value collection of properties covered by this type

*Definition*

```
protected void Initialize (
    void
);
```

*Parameters*

None

*Remarks*

None

*Exceptions*

PrintSystemObject.Commit Method

Commits the attribute values to the Spooler service.

*Definition*

```
public abstract void Commit (
    void
);
```

*Parameters*

None

*Remarks*

None

*Return Value*

None

*Exceptions*

PrintSystemObject.Refresh Method

Refreshes the attribute values with data from the Spooler service.

*Definition*

```
public abstract void Refresh (
    void
);
```

*Parameters*

None

*Remarks*

None

*Return Value*

None

*Exceptions*

PrintSystemObject.Dispose Method

Disposes the object.

*Definition*

```
public override void Dispose (
    void
);
```

*Parameters*

None

*Remarks*

None

*Return Value*

None

*Exceptions*

PrintSystemObject.SubscribeForAsynchronousNotifications Method

*Definition*

```
AsynchronousNotificationsSubscription*
    SubscribeForAsynchronousNotifications (
    ConversationStyle conversationStyle,
    System::Guid notificationDataType,
    UserNotificationFilter perUserNotificationFilter
);
```

*Parameters*

ConversationStyle *conversationStyle*

System::Guid *notificationDataType*

UserNotificationFilter *perUserNotificationFilter*

*Remarks*

None

*Return Value*

*Exceptions*

Properties

PrintSystemObject.Name Property

Name identifier of this object.

*Definition*

```
public virtual String* Name { get; set; }
```

*Property Value*

This property is read/write.

*Exceptions*

*Applies To*

PrintSystemObject.Parent Property

Parent of this object

*Definition* public virtual PrintSystemObject* Parent { get; }

*Property Value*

This property is read-only.

*Exceptions*

*Applies To*

PrintSystemObject.PropertiesCollection Property

Collection of attribute-value objects that represent the properties of this object.

*Definition* public PrintSystemAttributeValueDictionary PropertiesCollection { get; }

*Property Value*

This property is read-only.

*Exceptions*

*Applies To*

PrintSystemObject.TrackedPropertiesProperty

Parent of this object

*Definition* public StringCollection* TrackedProperties { get; }

*Property Value*

This property is read-only.

*Exceptions*

*Applies To*

PrintServer

The class abstracts the functionality of a print server.

Definition public class PrintServer: PrintSystemObject, IDisposable

Namespace: System.Printing.PrintSubSystem
Assembly: System.Printing

Header File: PrintServer.hpp

Events

None

Constructors

PrintServer.PrintServer

Creates a new instance of the PrintServer class.

*Overload List*

```
public PrintServer();
public PrintServer(String*);
public PrintServer(PrintSystemDesiredAccess);
public PrintServer(String*, PrintSystemDesiredAccess);
public PrintServer(String*, PrintServerProperty[ ]);
public PrintServer(String*, String**);
public PrintServer(String*,
    PrintServerProperty[],PrintSystemDesiredAccess);
```

*Definition*

```
public PrintServer (
    void
);
public PrintServer (
    String* pathString
);
public PrintServer (
    PrintSystemDesiredAccess desiredAccess
);
public PrintServer (
    String* pathString,
    PrintSystemDesiredAccess desiredAccess
);
public PrintServer (
    String* pathString,
    PrintServerProperty  propertiesFilter[]
);
```

```
public PrintServer (
    String* pathString,
    String* propertiesFilterString[]
);
public PrintServer (
    String* pathString,
    PrintServerProperty propertiesFilter[],
    PrintSystemDesiredAccess desiredAccess
);
```

*Parameters*

*pathString* : The path parameter could be a Net Bios name, a UNC path or an http path. The path is validated by the Print Providers inside the Print Spooler. If this value is null, the object bounds to the print server hosted by the current machine.

*desiredAccess* : The value defaults to PrintSystemDesiredAccess::EnumerateServer if it is not present.

*propertiesFilter* : This is the array of properties that will be initialized when the object is created. Initializing a property requires a trip to the Spooler service. This constructor provides a way for the caller to improve the performance by initializing only the properties that will be accessed hence minimizing the amount of data transferred. The rest of the properties that are not in this array will be initialized on first use.

*propertiesFilterString* : This is the array of strings that identifies the properties that will be initialized when the object is created. This constructor provides a way for the caller to improve the performance by initializing only the properties that will be accessed. The rest of the properties that are not in this array will be initialized on first use.

*Remarks*

All properties are initialized unless a *propertiesFilter* or a *propertiesFilterString* parameter is provided.

The object binds to the print server hosted by the machine named in the path string or the current machine if the path string is NULL or not provided.

*Return Value*

None

*Exceptions*

System::Printing::PrintSubSystem::PrintServerException

Methods

PrintServer.InstallPrintQueue Method

Installs a print queue on the print server.

*Overload List* public PrintQueue InstallPrintQueue (String*, String*, String**, String*, PrintQueueAttributes);
public PrintQueue InstallPrintQueue (String*, String*, String**, String*, PrintQueueAttributes, PrintQueueStringProperty*, Int32, Int32);
public PrintQueue InstallPrintQueue (String*, String*, String**, String*, PrintQueueAttributes, String*, String*, String*, String*, Int32, Int32);
public PrintQueue InstallPrintQueue (String*, String*, String**, String*, PrintSystemAttributeValueDictionary*);

*Definition* public PrintQueue InstallPrintQueue (
String* *printQueueName,*
String* *driverName,*
String* *portNames[],*
String* *printProcessorName,*
PrintQueueAttributes *printQueueAttributes*
);
public PrintQueue InstallPrintQueue (
String* *printQueueName,*
String* *driverName,*
String* *portNames[],*
String* *printProcessorName,*
PrintQueueAttributes *printQueueAttributes,*
PrintQueueStringProperty* *requiredPrintQueueProperty,*
Int32 *requiredPriority,*
Int32 *requiredDefaultPriority*
);
public PrintQueue InstallPrintQueue (
String* *printQueueName,*
String* *driverName,*
String* *portNames[],*
String* *printProcessorName,*
PrintQueueAttributes *printQueueAttributes,*
String* *requiredShareName,*
String* *requiredComment,*
String* *requiredLocation,*
String* *requiredSeparatorFile,*
Int32 *requiredPriority,*

```
    Int32 requiredDefaultPriority
);
public PrintQueue InstallPrintQueue (
    String*  printQueueName,
    String*  driverName,
    String* portNames[],
    String*  printProcessorName,
    PrintSystemAttributeValueDictionary parameterCollection
);
```

*Parameters* string printQueueName string driverName string[] portNames string printProcessorName

PrintQueueAttributes printQueueAttributes

PrintQueueStringProperty requiredPrintQueueProperty

Int32 requiredPriority

Int32 requiredDefaultPriority string requiredShareName string requiredComment string requiredLocation string requiredSeparatorFile

PrintSystemAttributeValueCollection parameterCollection

*Remarks*

None

*Return Value*

PrintQueue object

*Exceptions* message: An exception occurred while installing a print queue AND Win32 error is: <formatted Win32 error>.

PrintServer.DeletePrintQueue Method

Deletes a print queue on the print server.

*Overload List*

```
public void DeletePrintQueue (String*);
public void DeletePrintQueue (PrintQueue*);
```

*Definition*

```
public void DeletePrintQueue (
    String* printQueueName);
public void DeletePrintQueue (
    PrintQueue* printQueueObject);
```

*Parameters* string printQueueName

PrintQueue printQueueObject

*Remarks*

None

*Return Value*

None

*Exceptions*

PrintServerException
message: An exception occurred while deleting a print queue. Win32 error is: <formatted Win32 error>.

PrintServer.GetPrintQueue Method

Instantiates a PrintQueue object representing a preinstalled print queue on this print server.

*Overload List*

```
public PrintQueue* GetPrintQueue(String*);
public PrintQueue* GetPrintQueue(String*, String**);
```

*Definitions*

```
public PrintQueue* GetPrintQueue(
    String* printQueueName
);
```

```
public PrintQueue* GetPrintQueue(
    String* printQueueName,
    String* propertiesFilter[]
);
```

*Parameters* string printQueueName string[] propertiesFilter

*Remarks*

If no properties are specified in a properties filter parameter, The PrintQueue object is initialized with all supported properties. If properties are specified in a properties filter array, then The PrintQueue object is initialized with the properties specified in the propertiesFilter array.

Initializing properties requires trips to the Spooler service. This method provides a way for the caller to improve the performance by initializing only the properties that will be accessed.

*Return Value*

PrintQueue object.

*Exceptions*

PrintQueueException

PrintServer.GetPrintQueues Method

Returns a PrintQueues collection of PrintQueue objects representing the print queues installed on this print server.

*Overload List*

```
public PrintQueueCollection* GetPrintQueues ();
public PrintQueueCollection* GetPrintQueues (
    String**);
public PrintQueueCollection* GetPrintQueues (
    EnumeratedPrintQueuesType[]);
public PrintQueueCollection* GetPrintQueues (
    PrintQueueProperty[]);
public PrintQueueCollection* GetPrintQueues (
    PrintQueueProperty[],EnumeratedPrintQueuesType[]);
public PrintQueueCollection GetPrintQueues (
    String**, EnumeratedPrintQueuesType[]);
```

*Definitions*

```
public PrintQueueCollection* GetPrintQueues (
    void
);
public PrintQueueCollection* GetPrintQueues (
    String* propertiesFilterStrings[]
);
public PrintQueueCollection* GetPrintQueues (
    EnumeratedPrintQueuesType enumerationFlag[]
);
public PrintQueueCollection* GetPrintQueues (
    PrintQueueProperty[] propertiesFilter
);
public PrintQueueCollection* GetPrintQueues (
    PrintQueueProperty[] propertiesFilter,
    EnumeratedPrintQueuesType[] enumerationFlag
);
public PrintQueueCollection* GetPrintQueues (
    String* propertiesFilterStrings[],
    EnumeratedPrintQueuesType[] enumerationFlag
);
```

*Parameters*

*propertiesFilter* : Specifies the properties to initialize.

*propertiesFilterStrings* : Specifies the properties to initialize.

*enumerationFlag* : Specifies the types of PrintQueue objects to return. If the enumerationflag is used, The PrintQueue objects of the type specified by the enumerationFlag are returned.

*Remarks*

If properties are specified, only those properties are initialized in the PrintQueue objects returned. Initializing properties this method to query the Spooler service.

If only a subset of the properties are required, performance can be improved by initializing only those properties desired.

*Return Values*

PrintQueues object

*Exceptions*

None

PrintServer.Commit Method

Commits the properties marked as modified to the Print Spooler service.

*Definition*

```
public override void Commit (
    void
);
```

*Parameters*

None

*Remarks*

When a property is set, the data is cached and the property is marked as "dirty". There are no calls made to the Print Spooler service until the caller calls Commit. The caller can call Refresh to rollback the changes.

*Return Values*

None

*Exceptions*

PrintCommitAttributesException

An exception occurred while committing the properties for the PrintServer object. Win32 error: {0}.

PrintServer.Refresh Method

Synchronizes the properties with the current data from the Print Spooler service.

*Definition*

```
public override void Refresh (
    void
);
```

*Parameters*

None

*Remarks*

The properties in the corresponding object in the Spooler service could change without this object being notified. Calling Refresh, any properties changed locally and not committed are lost.

*Return Value*

None

*Exceptions*

PrintQueueException

An exception occurred while refreshing the properties for the PrintServer object. Win32 error: {Formatted Win32 error}.

PrintServer.Dispose Method

Disposes the object.

*Definition* public override void Dispose (void);

*Parameters*

None

*Remarks*

None

*Return Value*

None

*Exceptions*

None

Properties

PrintServer.Name Property

Name inherited from the PrintSystemObject.

*Definition* public String* Name {get; set;}

*Property Value*

Name identifier of the print server

This property is read/write.

*Exceptions*

None

*Applies To*

None

PrintServer.BeepEnabled Property

Gets or sets the "BeepEnabled" property of the print server

*Definition* public Boolean BeepEnabled {get; set;}

*Property Value*

True if the BeepEnabled setting is enabled on the print server causing the print server to beep when the job is printed.

The default value is false.

This property is read/write.

*Exceptions*

None

*Applies To*

None

PrintServer.NetPopUp Property

Gets or sets the "NetPopUp" property of the print server.

*Definition* public Boolean NetPopUp {get; set;}

*Property Value*

True if the NetPopUp setting is enabled on the print server. If enabled, the print server sends a network alert message to the user when the job is printer.

The default value is false.

This property is read/write.

*Exceptions*

None

*Applies To*

None

PrintServer.PortThreadPriority Property

Gets or sets the priority of the Port threads inside the Print Spooler service.

*Definition* public System::Threading::ThreadPriority PortThreadPriority {get; set;}

*Property Value*

Any value accepted by the OS.

This property is read/write.

*Exceptions*

None

*Applies To*

None

PrintServer.DefaultPortThreadPriority Property

Gets or sets the default priority of the Port threads created inside the Print Spooler service.

*Definition* public System::Threading::ThreadPriority DefaultPortThreadPriority {get; set;}

*Property Value*

Any value accepted by the OS.

This property is read/write.

*Exceptions*

None

*Applies To*

None

PrintServer.DefaultSchedulerPriority Property

Gets or sets the default priority of the Job Scheduler thread inside the Print Spooler service.

*Definition* public System::Threading::ThreadPriority DefaultSchedulerPriority {get; set;}

*Property Value*

Any value accepted by the OS.

This property is read/write.

*Exceptions*

None

*Applies To*

None

PrintServer.SchedulerPriority Property

Gets or sets the priority of the Job Scheduler thread inside the Print Spooler service.

*Definition* public System::Threading::ThreadPriority SchedulerPriority {get; set;}

*Property Value*

Any value accepted by the OS.

This property is read/write.

*Exceptions*

None

*Applies To*

None

PrintServer.DefaultSpoolDirectory Property

Gets or sets the default spooler directory for the Print Spooler service.

*Definition* public String* DefaultSpoolDirectory {get; set;}

*Property Value*

File path accessible from the print server machine.

This property is read/write.

*Exceptions*

None

*Applies To*

None

PrintServer.RestartJobOnPoolEnabled Property

Gets or sets the RestartJobOnPoolEnabled property of the print server.

*Definition* public Boolean RestartJobOnPoolEnabled {get; set;}

*Property Value*

True if the RestartJobOnPoolEnabled property of the print server is enabled. The print server will restart the jobs in an error state if this is enabled.

This setting applies only for print pooling.

The default value is false.

This property is read/write.

*Exceptions*

None

*Applies To*

None

PrintServer.RestartJobOnPoolTimeout Property

Gets or sets the RestartJobOnPoolError property of the print server.

*Definition*
public Int32 RestartJobOnPoolTimeout {get; set;}

*Property Value*

The number of milliseconds the print server waits before restarting a job in error state on in a printer pool.

The print server only uses this setting if RestartJobOnPoolEnabled is enabled on the print server.

The default value is 600,000 milliseconds (10 minutes).

This property is read/write.

*Exceptions*

None

*Applies To*

None

PrintServer.MajorVersion Property

Gets major version of the operating system on which the print server is running.

*Definition*
public Int32 MajorVersion {get}

*Property Value*

This property is read-only.

*Exceptions*

None

*Applies To*

None

PrintServer.MinorVersion Property

Gets minor version of the operating system on which the print server is running.

*Definition*
public Int32 MinorVersion {get}

*Property Value*

This property is read-only.

*Exceptions*

None

*Applies To*

None

PrintServer.OSVersion Property

Gets the version of the operating system on which the print server is running.

*Definition* public Byte OSVersion {get}

*Property Value*

This property is read-only.

*Exceptions*

None

*Applies To*

None

PrintServer.EventLog Property

Gets or sets the flags that configure the print server for Event logging.

*Definition* public PrintServerEventLogging EventLog {get;set;}

*Property Value*

This property is read/write.

*Exceptions*

None

*Applies To*

None

LocalPrintServer

This class abstracts the functionality of a print server running on the current machine.

Definition public class LocalPrintServer: PrintServer, IDisposable

Namespace: System.Printing.PrintSubsystem
Assembly: System.Printing

Header File: LocalPrintServer.hpp

Events

None

Constructors

LocalPrintServer.LocalPrintServer

Creates a new instance of the LocalPrintServer class.

*Overload List*

```
public LocalPrintServer (void);
public LocalPrintServer (PrintSystemDesiredAccess);
public LocalPrintServer (String**
public LocalPrintServer (PrintServerProperty[]);
public LocalPrintServer (PrintServerProperty[],
    PrintSystemDesiredAccess);
public LocalPrintServer (String**, PrintSystemDesiredAccess);
```

*Definitions*

```
public LocalPrintServer (
    void
);
public LocalPrintServer (
    PrintSystemDesiredAccess desiredAccess
);

public LocalPrintServer (
    String*propertiesFilterStrings[]
);
public LocalPrintServer (
    PrintServerProperty[] propertiesFilter
```

```
);
public LocalPrintServer (
    PrintServerProperty[] propertiesFilter,
    PrintSystemDesiredAccess desiredAccess
);
public LocalPrintServer (
    String*propertiesFilterStrings[],
    PrintSystemDesiredAccess desiredAccess
);
```

*Parameters*

*propertiesFilterStrings* : This is the array of properties that will be initialized when the object is created. Initializing a property requires a trip to the Spooler service. This constructor provides a way for the caller to improve the performance by initializing only the properties that will be accessed. If null or not supplied by the *propertiesFilter* array, all properties are initialized.

*propertiesFilter* : This is the array of properties that will be initialized when the object is created. Initializing a property requires a trip to the Spooler service. This constructor provides a way for the caller to improve the performance by initializing only the properties that will be accessed. If null or not supplied by the *propertiesFilterStrings* array, all properties are initialized.

*desiredAccess* : Specifies the desired access for this object. If not supplied the default access is PrintSystemDesiredAccess::EnumerateServer

*Remarks*

The object bounds to the print server hosted by the current machine.

*Return Value*

*Exceptions*

Methods

LocalPrintServer.ConnectToPrintQueue Method

This method creates a printer connection to the printer identified by printer parameter.

*Overload List* public Boolean ConnectToPrintQueue (PrintQueue);

public Boolean ConnectToPrintQueue (String*);

*Definition*

```
public Boolean ConnectToPrintQueue (
    PrintQueue printerQueue
);
public Boolean ConnectToPrintQueue (
    String* printerSting
);
```

*Parameters*

PrintQueue printerQueue string printerSting

*Remarks*

The printer cannot be local to this printer server.

*Return Value*

*Exceptions*

PrintServerException

An exception occurred while creating the printer connection. Win32 error: {Formatted Win32 error message}

Properties

LocalPrintServer.DefaultPrintQueue Property

Gets or sets the per user default print queue property

*Definition*

```
public PrintQueue DefaultPrintQueue { get; set; }
```

*Property Value*

This property is read/write.

*Exceptions*

PrintServerException

An exception occurred while getting the default printer . Win32 error: {Formatted Win32 error message}

*Applies To*

None

LocalPrintServer.DefaultPrintQueueName Property

Gets or sets the per user default print queue name property.

*Definition* public String* DefaultPrintQueueName { get; set; }

*Property Value*

This property is read/write.

*Exceptions*

PrintServerException

An exception occurred while setting the default printer . Win32 error: {Formatted Win32 error message}

*Applies To*

None

PrintQueue

The class abstracts the functionality of a logical printer normally referred to as .Print Queue

Definition public class PrintQueue: PrintSystemObject, IDisposable

Namespace: System.Printing.PrintSubSystem
Assembly: System.Printing

Header File: PrintQueue.hpp

Events

None

Constructors

PrintQueue.PrintQueue

Creates a new instance of the PrintQueue class.

*Overload List*

```
public PrintQueue (PrintServer*, String*);
public PrintQueue (PrintServer*, String*, Int32);
public PrintQueue (PrintServer*, String*, String**);
public PrintQueue (PrintServer*, String*, PrintQueueProperty[]);
public PrintQueue (PrintServer*, String*,
    PrintSystemDesiredAccess);
public PrintQueue (PrintServer*, String*, Int32,
    PrintSystemDesiredAccess);
public PrintQueue (PrintServer*, String*, String**,
    PrintSystemDesiredAccess);
public PrintQueue (PrintServer*, String*,
    PrintQueueProperty[],PrintSystemDesiredAccess);
```

*Definition*

```
public PrintQueue (
    PrintServer* printServer,
    String* printQueueName
);
public PrintQueue (
    PrintServer* printServer,
    String* printQueueName,
    Int32 schemaVersion
);
public PrintQueue (
    PrintServer* printServer,
    String* printQueueName,
    String* propertiesFilterString[],
);
public PrintQueue (
    PrintServer* printServer,
    String* printQueueName,
    PrintQueueProperty propertiesFilter[]
);
public PrintQueue (
    PrintServer* printServer,
    String* printQueueName,
    PrintSystemDesiredAccess desiredAccess
);
public PrintQueue (
    PrintServer* printServer,
    String* printQueueName,
    Int32 schemaVersion,
    PrintSystemDesiredAccess desiredAccess
);
public PrintQueue (
    PrintServer printServer,
    String* printQueueName,
```

```
    String* propertiesFilterString[]
    PrintSystemDesiredAccess desiredAccess
);
public PrintQueue (
    PrintServer* printServer,
    String* printQueueName,
    PrintQueueProperty propertiesFilter[],
    PrintSystemDesiredAccess desiredAccess
);
```

*Parameters* printServer printQueueName

*schemaVersion* : The JobTicket schema version the client supports.

*propertiesFilterString* : The array of properties that will be initialized when the object is created. Initializing a property requires a trip to the Spooler service. This constructor provides a way for the caller to improve the performance by initializing only the properties that will be accessed hence minimizing the amount of data transferred

*propertiesFilter* : This is the array of properties that will be initialized when the object is created. Initializing a property requires a trip to the Spooler service. This constructor provides a way for the caller to improve the performance by initializing only the properties that will be accessed hence minimizing the amount of data transferred.

*desiredAccess* : Requested permissions to be granted.

*Remarks*

If no *propertiesFilter* parameter or *propertiesFilterString* parameter is provided, all properties are initialized.

The object binds to the printer hosted by the server named in the *PrintServer parameter*.

Desired access defaults to PrintSystemDesiredAccess.UsePrinter if not specified.

*Return Value*

None

*Exceptions*

PrintQueueException

Methods

PrintQueue.Install Method

Installs a print queue on the print server.

*Overload List*

```
public static PrintQueue Install (PrintServer*, String*, String*,
    String**, String*, PrintQueueAttributes);
public static PrintQueue Install (PrintServer*, String*, String*,
    String**, String*, PrintQueueAttributes,
    PrintQueueStringProperty*, Int32, Int32);
public static PrintQueue Install (PrintServer*, String*, String*,
    String**, String*, PrintQueueAttributes, String*, String*, String*,
    String*, Int32, Int32);
public static PrintQueue Install (PrintServer*, String*, String*,
    String**, String*, PrintSystemAttributeValueDictionary*);
```

*Definition*

```
public static PrintQueue Install (
    PrintServer* printServer,
    String* printQueueName,
    String* driverName,
    String* portNames[],
    String* printProcessorName,
    PrintQueueAttributes printQueueAttributes
);
public static PrintQueue Install (
    PrintServer* printServer,
    String* printQueueName,
    String* driverName,
    String* portNames[],
    String* printProcessorName,
    PrintQueueAttributes printQueueAttributes,
    PrintQueueStringProperty* requiredPrintQueueProperty,
    Int32 requiredPriority,
    Int32 requiredDefaultPriority
);
public static PrintQueue Install (
    PrintServer* printServer,
    String* printQueueName,
    String* driverName,
    String* portNames[],
    String* printProcessorName,
    PrintQueueAttributes printQueueAttributes,
```

```
        String* requiredShareName,
        String* requiredComment,
        String* requiredLocation,
        String* requiredSeparatorFile,
        Int32 requiredPriority,
        Int32 requiredDefaultPriority
    );
    public PrintQueue Install (
        PrintServer* printServer,
        String* printQueueName,
        String* driverName,
        String* portNames[],
        String* printProcessorName,
        PrintSystemAttributeValueDictionary* parameterCollection
    );
```

*Parameters*

PrintSystemAttributeValueCollection *parameterCollection* : This is the collection of the optional values that could be used when installing the print queue.

*Remarks*

None

*Return Value*

PrintQueue object

*Exceptions*

PrintQueueException
message: An exception occurred while installing a print queue AND Win32 error is: <formatted Win32 error>.

PrintQueue.Delete Method

Deletes a print queue from the print server.

*Definition*

```
    public Boolean Delete (
        String* printQueueName
    );
```

*Parameters* string printQueueName

*Remarks*

None

*Return Value*

Boolean

*Exceptions*

PrintQueueException
message: An exception occurred while deleting a print queue. Win32 error is: <formatted Win32 error>.

PrintQueue.AcquireDeviceCapabilities Method

Acquire the capabilities of the device relative to the given job ticket.

*Definition* public Stream AcquireDeviceCapabilities (
    Stream* *jobTicket*
);

*Parameters*

Stream *jobTicket* :The input job ticket used to build the capabilities of the device. If NULL, the default JobTicket of the device is used.

*Remarks*

None

*Return Value*

Stream containing the XML device capabilities.

*Exceptions*

ObjectDisposedException

ArgumentException.

PrintQueue.MergeAndValidateJobTicket Method

Merge the delta JobTicket onto the base JobTicket and validates the resultant JobTicket

*Definition*

```
public ValidationResult MergeAndValidateJobTicket (
    Stream* basejobTicket,
    Stream* deltaJobTicket
);
```

*Parameters* baseJobTicket: Stream deltaJobTicket: Stream

*Remarks*

*Return Value*

The validation result structure

*Exceptions*

ObjectDisposedException

ArgumentNullException

ArgumentException

PrintQueue.Pause Method

Pauses the print queue.

*Definition*

```
public void Pause (
    void
);
```

*Parameters*

None

*Remarks*

None

*Return Value*

None

*Exceptions*

PrintQueueException

SecurityException

PrintQueue.Resume Method

Resumes a paused print queue

*Definition*

```
public void Resume (
    void
);
```

*Parameters*

None

*Remarks*

None

*Return Value*

None

*Exceptions*

PrintQueueException

SecurityException

PrintQueue.AddJob Method

*Overload List*

PrintSystemJobInfo* AddJob (Type*);

PrintSystemJobInfo* AddJob (Type*, String*);

*Definition*

```
PrintSystemJobInfo* AddJob (
    Type* jobType
);
PrintSystemJobInfo* AddJob (
    Type* jobType,
    String* spoolFile
);
```

*Parameters*

Type* *jobType,*

String* *spoolFile*

*Remarks*

None

*Return Value*

None

*Exceptions*

None

PrintQueue.GetJob Method

*Definition*

```
PrintSystemJobInfo* GetJob (
    String* jobName
);
```

*Parameters*

String* *jobName*

*Remarks*

None

*Return Value*

None

*Exceptions*

None

PrintQueue.Purge Method

Deletes all jobs in the print queue.

*Definition*

```
public void Purge (
    void
);
```

*Parameters*

None

*Remarks*

None

*Return Value*

None

*Exceptions*

PrintQueueException

SecurityException

PrintQueue.Commit Method

Commits the properties marked as modified to the Print Spooler service.

*Definition*

```
public void Commit (
    void
);
```

*Parameters*

None

*Remarks*

Inherited from PrintSystemObject.

*Return Value*

None

*Exceptions*

PrintCommitAttributesException

PrintQueue.Refresh Method

Synchronizes the data in the properties with the live data from the Print Spooler service..

*Definition*

```
public void Refresh (
    void
);
```

*Parameters*

None

*Remarks*

When calling Refresh, data in uncommitted properties is lost.

Inherited from PrintSystemObject.

*Return Value*

None

*Exceptions*

PrintQueueException

Properties

PrintQueue.AreCompletedJobsScheduledFirst Property

Gets the DO_COMPLETE_FIRST property of the print queue.

*Definition* public Boolean AreCompletedJobsScheduledFirst {get;}

*Property Value*

True, when the DO_COMPLETE_FIRST property of the print queue is enabled. If the DO_COMPLETE_FIRST property is enabled, jobs that have completed spooling are scheduled to print before jobs that have not completed spooling.

The default value is True.

This property is read-only.

*Exceptions*

None

*Applies To*

None

*Remark*

Setting the value is an administrative task and hence excluded from this first cut of the APIs

PrintQueue.ArePrintedJobsKept Property

Gets the KEEP_PRINTED_JOBS property of the print queue.

*Definition* public Boolean ArePrintedJobsKept {get;}

*Property Value*

True when the KEEP_PRINTED_JOBS property of the print queue is enabled. If the KEEP_PRINTED_JOBS property of the print queue is enabled, jobs are kept after they are printed, otherwise, the jobs are deleted.

The default value is false.

This property is read-only.

*Exceptions*

None

*Applies To*

None

*Remark*

PrintQueue.AveragePpm Property

Gets the AveragePPM property of the print queue.

*Definition* public virtual int AveragePpm { get; set;}

*Property Value*

The average number of pages per minute the print queue has processed.

This property is read/write.

*Exceptions*

None

*Applies To*

None

*Remark*

PrintQueue.ClientPrintSchemaVersion Property

*Definition* public Int32 ClientPrintSchemaVersion { get; }

*Property Value*

This property is read-only.

*Exceptions*

None

*Applies To*

None

PrintQueue.Comment Property

Gets or sets the comment field on the print queue

*Definition* public virtual String* Comment { get; set; }

*Property Value*

Any string selected by the user including null

This property is read/write.

*Exceptions*

None

*Applies To*

None

PrintQueue.DefaultJobTicket Property

Gets or sets the global default job ticket (settings) of the print queue.

*Definition* public virtual Stream DefaultJobTicket { get; set; }

*Property Value*

The values are mainly controlled by the driver installed on that print queue and validation happens in the API and the spooler for valid range of values to different setting, like paper orientation, resolution ... etc.

This property is read/write.

*Exceptions*

None

*Applies To*

None

PrintQueue.DefaultPriority Property

Gets the default priority assigned to the printed job.

*Definition* public Int32 DefaultPriority {get; set;}

*Property Value*

[1..99]

This property is read/write.

*Exceptions*

None

*Applies To*

None

PrintQueue.Description Property

Gets or sets the description field on the print queue

*Definition* public virtual String* Description { get; set; }

*Property Value*

Any string selected by the user including null

This property is read/write.

*Exceptions*

None

*Applies To*

None

PrintQueue.DeviceNamespaces Property

None

*Definition* public StringCollection* DeviceNamespaces { get; }

*Property Value*

This property is read-only.

*Exceptions*

None

*Applies To*

None

PrintQueue.DoPagePunt Property

Gets the status of the current print queue indicating that it can't print the current job

*Definition* public Boolean DoPagePunt { get; }

*Property Value*

This property is read-only.

*Exceptions*

None

*Applies To*

None

PrintQueue.FullName Property

*Definition* public String* FullName {get;}

*Property Value*

This property is read-only.

*Exceptions*

None

*Applies To*

None

PrintQueue.HasNoToner Property

Gets the status of the current print queue indicating that it is low on toner.

*Definition* public Boolean HasNoToner { get; }

*Property Value*

This property is read-only.

*Exceptions*

None

*Applies To*

None

PrintQueue.HasPaperProblem Property

Gets the status of the current print queue indicating that there is a paper problem

*Definition* public Boolean HasPaperProblem { get; }

*Property Value*

This property is read-only.

*Exceptions*

None

*Applies To*

None

PrintQueue.HostingPrintServer Property

Gets the print server hosting the print queue

*Definition* public virtual PrintServer* HostingPrintServer { get;}

*Property Value*

A valid string pointing to the print server hosting the print queue. Null is also valid indicating the local print server This property is read-only.

*Exceptions*

None

*Applies To*

None

PrintQueue.IsBidiEnabled Property

Gets the status of bi-directional communication for the print queue.

*Definition* public Boolean IsBidiEnabled { get; }

*Property Value*

This property is read-only.

*Exceptions*

None

*Applies To*

None

PrintQueue.IsBusy Property

Gets the status of the current print queue indicating whether the printer is busy printing a job or not

*Definition* public Boolean IsBusy { get; }

*Property Value*

This property is read-only.

*Exceptions*

None

*Applies To*

None

PrintQueue.IsDevQEnabled Property

Gets the DevQueryEnabled property of the print queue.

*Definition* public Boolean IsDevQEnabled { get; }

*Property Value*

If DevQueryEnabled is set, the printer will fail jobs with settings that do not match those of the printer device.

The default value is True.

This property is read-only.

*Exceptions*

None

*Applies To*

None

PrintQueue.IsDirect Property

Gets the configuration of the spooler for the print queue.

*Definition*
public Boolean IsDirect { get; }

*Property Value*

True if the print queue will send the jobs directly to the printer. False if the print queue will spool the jobs before printing.

This property is read-only.

*Exceptions*

None

*Applies To*

None

PrintQueue.IsDoorOpened Property

Gets the status of the current print queue indicating whether the printer door is open or not

*Definition*
public Boolean IsDoorOpened { get; }

*Property Value*

True if the printer door is open. False if it is closed.

This property is read-only.

*Exceptions*

None

*Applies To*

None

PrintQueue.IsDualHeaded Property

*Definition*
public Boolean IsDualHeaded { get; }

*Property Value*

This property is read-only.

*Exceptions*

None

*Applies To*

None

PrintQueue.IsHidden Property

*Definition* public Boolean IsHidden { get; }

*Property Value*

This property is read-only.

*Exceptions*

None

*Applies To*

None

PrintQueue.IsInError Property

*Definition* public Boolean IsInError { get; }

*Property Value*

This property is read-only.

*Exceptions*

None

*Applies To*

None

PrintQueue.IsInitializing Property

Gets the status of the current print queue indicating that the printer is initializing.

*Definition* public Boolean IsInitializing { get; }

*Property Value*

True if the printer for this print queue is initializing. False if it is not initializing.

This property is read-only.

*Exceptions*

None

*Applies To*

None

PrintQueue.IsIOActive Property

Gets the status of the current print queue indicating that the printer is in an active input/output state

*Definition* public Boolean IsIOActive { get; }

*Property Value*

This property is read-only.

*Exceptions*

None

*Applies To*

None

PrintQueue.IsManualFeedRequired Property

Gets the status of the current print queue indicating that the printer is in a manual feed state.

*Definition* public Boolean IsManualFeedRequired { get; }

*Property Value*

True when paper must be manually fed into the printer for this print queue. False if no paper needs to be manually fed into the printer.

This property is read-only.

*Exceptions*

None

*Applies To*

None

PrintQueue.IsNotAvailable Property

Gets the status of the current print queue indicating that the printer is not available for printing.

*Definition* public Boolean IsNotAvailable { get; }

*Property Value*

This property is read-only.

*Exceptions*

None

*Applies To*

None

PrintQueue.IsOffline Property

Gets the status of the current print queue indicating that the printer is offline.

*Definition* public Boolean IsOffline { get; }

*Property Value*

This property is read-only.

*Exceptions*

None

*Applies To*

None

PrintQueue.IsOutOfMemory Property

Gets the status of the current print queue indicating that the printer ran out of memory.

*Definition*
public Boolean IsOutOfMemory { get; }

*Property Value*

This property is read-only.

*Exceptions*

None

*Applies To*

None

PrintQueue.IsOutOfPaper Property

Gets the status of the current print queue indicating that the printer is out of paper.

*Definition*
public Boolean IsOutOfPaper { get; }

*Property Value*

This property is read-only.

*Exceptions*

None

*Applies To*

None

PrintQueue.IsOutputBinFull Property

Gets the status of the current print queue indicating that the printer's output bin is full.

*Definition*
public Boolean IsOutputBinFull { get; }

*Property Value*

This property is read-only.

*Exceptions*

None

*Applies To*

None

PrintQueue.IsPaperJamed Property

Gets the status of the current print queue indicating that the printer is paper jammed.

*Definition* public Boolean IsPaperJamed { get; }

*Property Value*

This property read-only.

*Exceptions*

None

*Applies To*

None

PrintQueue.IsPaused Property

Property Description Text

*Definition* public Boolean IsPaused { get; }

*Property Value*

This property is read-only.

*Exceptions*

None

*Applies To*

None

PrintQueue.IsPendingDeletion Property

Gets the status of the current print queue indicating that the printer is in the process of deleting a print job.

*Definition* public Boolean IsPendingDeletion { get; }

*Property Value*

This property is read-only.

*Exceptions*

None

*Applies To*

None

PrintQueue.IsPowerSaveOn Property

Gets the status of the current print queue indicating that the printer is in the power save mode

*Definition* public Boolean IsPowerSaveOn { get; }

*Property Value*

This property is read-only.

*Exceptions*

None

*Applies To*

None

PrintQueue.IsPrinting Property

Gets the status of the current print queue indicating that the printer is currently actively printing a job.

*Definition* public Boolean IsPrinting { get; }

*Property Value*

This property is read-only.

*Exceptions*

None

*Applies To*

None

PrintQueue.IsProcessing Property

Gets the status of the current print queue indicating that the printer is currently processing a job.

*Definition* public Boolean IsProcessing { get; }

*Property Value*

This property is read-only.

*Exceptions*

None

*Applies To*

None

PrintQueue.IsPublished Property

Gets the status of the current print queue indicating that the printer is published in the Active Directory or not.

*Definition* public Boolean IsPublished { get; }

*Property Value*

This property is read-only.

*Exceptions*

None

*Applies To*

None

PrintQueue.IsQueued Property

Gets the status of the current print queue indicating whether the job has to be completely spooled before printing the first page or whether printing can take place while spooling.

*Definition* public Boolean IsQueued { get; }

*Property Value*

This property is read-only.

*Exceptions*

None

*Applies To*

None

PrintQueue.IsRawOnlyEnabled Property

*Definition* public Boolean IsRawOnlyEnabled{ get; }

*Property Value*

This property is read-only.

*Exceptions*

None

*Applies To*

None

PrintQueue.IsServerUnknown Property

*Definition* public Boolean IsServerUnknown {get; }

*Property Value*

This property is read-only.

*Exceptions*

None

*Applies To*

None

PrintQueue.IsShared Property

Gets the status of the current print queue indicating whether the printer is shared or not.

*Definition* public Boolean IsShared { get; }

*Property Value*

This property is read-only.

*Exceptions*

None

*Applies To*

None

PrintQueue.IsTonerLow Property

*Definition* public Boolean IsTonerLow {get; }

*Property Value*

This property is read-only.

*Exceptions*

None

*Applies To*

None

PrintQueue.IsWaiting Property

Gets the status of the current print queue indicating that the printer is waiting on some external factor.

*Definition* public Boolean IsWaiting { get; }

*Property Value*

This property is read-only.

*Exceptions*

None

*Applies To*

None

PrintQueue.IsWarmingUP Property

Gets the status of the current print queue indicating that the printer is currently warming up.

*Definition* public Boolean IsWarmingUP { get; }

*Property Value*

This property is read-only.

*Exceptions*

None

*Applies To*

None

PrintQueue.Location Property

Gets or sets the location field on the print queue

*Definition* public virtual String* Location { get; set; }

*Property Value*

Any string selected by the user including null

This property is read/write.

*Exceptions*

None

*Applies To*

None

PrintQueue.MaxPrintSchemaVersion Property

*Definition* public Int32 MaxPrintSchemaVersion { get; }

*Property Value*

This property is read-only.

*Exceptions*

None

*Applies To*

None

PrintQueue.Name Property

Inherited from PrintSystemObject.

*Definition* public String* Name {get; set;}

*Property Value*

Name identifier of the print queue.

This property is read/write.

*Exceptions*

None

*Applies To*

None

PrintQueue.NeedUserIntervention Property

Gets the status of the current print queue indicating that the printer is in an error state that requires the user to do something.

*Definition* public Boolean NeedUserIntervention { get; }

*Property Value*

This property is read-only.

*Exceptions*

None

*Applies To*

None

PrintQueue.NumberOfJobs Property

Gets the number of jobs currently queues by the print queue.

*Definition* public virtual int NumberOfJobs { get; }

*Property Value*

This property is read-only.

*Exceptions*

None

*Applies To*

None

PrintQueue.Parent Property

*Definition* public PrintSystemObject* Parent {get;}

*Property Value*

This property is read-only.

*Exceptions*

None

*Applies To*

None

PrintQueue.PrintQueueAttributes Property

*Definition* public PrintQueueAttributes QueueAttributes {get;}

*Property Value*

This property is read-only.

*Exceptions*

None

*Applies To*

None

PrintQueue.Priority Property

Gets or Sets the priority assigned to the printed job.

*Definition* public virtual int Priority { get; set; }

*Property Value*

[1..99]

This property is read/write.

*Exceptions*

None

*Applies To*

None

PrintQueue.QueueDriver Property

Gets or Sets the driver used by the print queue.

*Definition* public virtual Driver QueueDriver { get; set; }

*Property Value*

Any properly constructed driver object representing an installed driver or an inbox driver installed from the local cab.

This property is read/write.

*Exceptions*

None

*Applies To*

None

PrintQueue.QueuePort Property

Gets or Sets the port used by the print queue.

*Definition*
public virtual Port QueuePort { get; set; }

*Property Value*

Any properly constructed port object representing a port already installed on the print server.

This property is read/write.

*Exceptions*

None

*Applies To*

None

PrintQueue.QueuePrintProcessor Property

Gets or Sets the print processor used by the print queue.

*Definition*
public virtual PrintProcessor QueuePrintProcessor { get; set; }

*Property Value*

Any properly constructed print processor object representing installed print processor or an inbox driver installed from the local cab.

This property is read/write.

*Exceptions*

None

*Applies To*

None

PrintQueue.QueueStatus Property

*Definition*
public PrintQueueStatus QueueStatus {get;}

*Property Value*

This property is read-only.

*Exceptions*

None

*Applies To*

None

PrintQueue.QueueStatusArray Property

*Definition* public PrintQueueStatus QueueStatusArray {get;}[]

*Property Value*

This property is read-only.

*Exceptions*

None

*Applies To*

None

PrintQueue.SepFile Property

Gets or Sets the separator file used by the print queue.

*Definition* public virtual String* SepFile { get; set; }

*Property Value*

A string that specifies the name of the file used to create the separator page. This page is used to separate print jobs sent to the printer.

This property is read/write.

*Exceptions*

None

*Applies To*

None

PrintQueue.ShareName Property

Gets or Sets the share name shared out by the print queue

*Definition* public virtual String* ShareName { get; set; }

*Property Value*

A string that identifies a share point for the printer

This property is read/write.

*Exceptions*

None

*Applies To*

None

PrintQueue.StartTime Property

Gets or Sets the earliest time by which a print queue can print a job.

*Definition* public virtual int StartTime { get; set; }

*Property Value*

This property is read/write.

*Exceptions*

None

*Applies To*

None

PrintQueue.UntilTime Property

Gets or Sets the latest time by which a print queue can print a job.

*Definition* public virtual int UntilTime { get; set; }

*Property Value*

This property is read/write.

*Exceptions*

None

*Applies To*

None

PrintQueue.UserJobTicket Property

Gets or sets the user default job ticket (settings) of the print queue.

*Definition* public virtual Stream UserJobTicket { get; set; }

*Property Value*

The values are mainly controlled by the driver installed on that print queue and validation happens in the API and the spooler for valid range of values to different setting, like paper orientation, resolution ... etc.

This property is read/write.

*Exceptions*

None

*Applies To*

None

PrintQueueStream

This class enables job consumers to write PDL data to the job's hosting print queue.

Definition public class PrintQueueStream : Stream, IDisposable

Namespace: System.Printing.PrintSubsystem
Assembly: System.Printing

Header File: PrintQueueStream.hpp

Events

None

Constructors

PrintQueueStream.PrintQueueStream

Creates a new instance of the PrintQueueStream class.

*Definition*

```
public PrintQueueStream (
    PrintQueue* printQueue
);
```

*Parameters*

PrintQueue* *printQueue*

*Remarks*

None

*Return Value*

None

*Exceptions*

None

Methods

PrintQueueStream.BeginWrite Method

*Definition*

```
IAsyncResult* BeginWrite (
    Byte array __gc[],
    Int32 offset,
    Int32 numBytes,
    AsyncCallback* userCallBack,
    Object* stateObject
);
```

*Parameters*

Byte array *__gc[]*

Int32 *offset*

Int32 *numBytes*

AsyncCallback* *userCallBack*

Object* *stateObject*

*Remarks*

None

*Return Value*

None

*Exceptions*

None

PrintQueueStream.EndWrite Method

*Definition*

Void EndWrite (
IAsyncResult* *asyncResult*
);

*Parameters*

IAsyncResult* *asyncResult*

*Remarks*

None

*Return Value*

None

*Exceptions*

None

PrintQueueStream.Read Method

*Definition*

Virtual int Read (
Byte array *__gc[],*

```
        int offset,
        int count
    );
```

*Parameters*

Byte array __*gc[]* int *offset* int *count*

*Remarks*

None

*Return Value*

None

*Exceptions*

None

PrintQueueStream.Write Method

*Definition*

```
    Virtual void Write (
        Byte array __gc[],
        int offset,
        int count
    );
```

*Parameters*

Byte array __*gc[]* int *offset* int *count*

*Remarks*

None

*Return Value*

None

*Exceptions*

None

PrintQueueStream.Flush Method

*Definition*

```
Virtual void Flush(
    void
);
```

*Parameters*

None

*Remarks*

None

*Return Value*

None

*Exceptions*

None

PrintQueueStream.Dispose Method

*Definition*

```
Virtual void Dispose (
    void
);
```

*Parameters*

None

*Remarks*

None

*Return Value*

None

*Exceptions*

None

PrintQueueStream.Seek Method

*Definition*

```
Virtual Int64 Seek (
    Int64 offset,
    SeekOrigin origin
);
```

*Parameters*

Int64 *offset*

SeekOrigin *origin*

*Remarks*

None

*Return Value*

None

*Exceptions*

None

PrintQueueStream.SetLength Method

*Definition*

```
Virtual void SetLength (
    Int64 value
);
```

*Parameters*

Int64 *value*

*Remarks*

None

*Return Value*

None

*Exceptions*

None

Properties

PrintQueueStream.CanRead Property

*Definition*
Public Boolean CanRead {get;}

*Property Value*

This property is read-only.

*Exceptions*

None

*Applies To*

None

PrintQueueStream.CanWrite Property

*Definition*
Public Boolean CanWrite {get;}

*Property Value*

This property is read-only.

*Exceptions*

None

*Applies To*

None

PrintQueueStream.CanSeek Property

*Definition*
Public Boolean CanSeek {get;}

*Property Value*

This property is read-only.

*Exceptions*

None

*Applies To*

None

PrintQueueStream.Length Property

*Definition*

Public Int64 Length {get;}

*Property Value*

This property is read-only.

*Exceptions*

None

*Applies To*

None

PrintQueueStream.Position Property

*Definition*

Public Int64 Position {get; set;}

*Property Value*

This property is read/write

*Exceptions*

None

*Applies To*

None

PrintQueueCollection

The class representing the collection of PrintQueues

Definition public class PrintQueueCollection: PrintSystemObject, IEnumerable, IDisposable

Namespace: System.Printing.PrintSubsystem
Assembly: System.Printing

Header File: PrintQueue.hpp

Events

None

Constructors

PrintQueueCollection. PrintQueueCollection

Creates a new instance of the PrintQueueCollection populated with the Local Print Queues on that on the local print server

*Overload List*

```
public PrintQueueCollection (void);
public PrintQueueCollection (String*, String**);
public PrintQueueCollection (String*,
    String**,EnumeratedPrintQueuesType*);
```

*Definition*

```
public PrintQueueCollection (
    void
);
public PrintQueueCollection (
    String* printServer,
    String* propertiesFilter[]
);
public PrintQueueCollection (
    String* printServer,
```

```
    String* propertiesFilter[],
    EnumeratedPrintQueuesType enumerationFlag[]
);
```

*Parameters*

*printServer* : specifies the name of the server from which to obtain the collection of print queues. If NULL or not specified, the local print server is used.

*propertiesFilter*nrhodes@shaw.ca specifies the properties to initialize in each PrintQueue object returned in the collection. If this parameter is not specified, all properties in each PrintQueue object are initialized.

*enumerationFlag* : specifies the characteristics of the PrintQueue objects to collect. If this parameter is specified, only those PrintQueue objects with matching types will be returned in the collection.

*Remarks*

*Return Values*

*Exceptions*

Methods

PrintQueueCollection.GetEnumerator Method

Returns an enumerator that can iterate through the collection.

*Definition*

```
public IEnumerator GetEnumerator (
    void
);
```

*Parameters*

None

*Remarks* nrhodes@shaw.ca*Return Value*

*Exceptions*

Properties

None

Filter

This is the abstract base class for installable objects in the Print System, such as Driver, PrintProcessors, etc.

Definition public abstract class Filter: PrintSystemObject, IDisposable

Namespace: System.Printing.PrintSubsystem
Assembly: System.Printing

Header File:

Events

None

Constructors

None

Methods

Filter.Commit Method

*Definition*

```
public override void Commit (
    void
);
```

*Parameters*

None

*Remarks*

*Return Value*

None

*Exceptions*

Filter.Refresh Method

Finalize the object

*Definition*

```
protected override void Refresh (
    void
);
```

*Parameters*

None

*Remarks*

*Return Value*

None

*Exceptions*

Properties

Filter.Name Property

Inherited from PrintSystemObject.

*Definition*

```
public String* Name {get; set;}
```

*Property Value*

Name identifier of the filter.

This property is read/write.

*Exceptions*

None

*Applies To*

None

Driver

This class abstracts the functionality of a printer driver. This object is returned by the Print System and cannot be instantiated by the end user.

The object has minimal functionality as it stands today. This is considered a "management" object and is expected to be extended by Beta1

Definition public class Driver: Filter, IDisposable

Namespace: System.Printing.PrintSubsystem
Assembly: System.Printing

Header File:

Events

None

Constructors

None

Methods

Driver.Dispose Method

*Definition*

```
public override void Dispose(
    void
);
```

*Parameters*

None

*Remarks*

*Return Value*

None

*Exceptions*

Driver.Finalize Method

Finalize the object

*Definition*

```
protected override void Finalize (
    void
);
```

*Parameters*

None

*Remarks*

*Return Value*

None

*Exceptions*

Properties

Driver.Name Property

Name identifier of the print driver.

*Definition*

```
public String* Name {get; set;}
```

*Property Value*

Inherited from PrintSystemObject.

This property is read/write.

*Exceptions*

None

*Applies To*

None

PrintProcessor

This class abstracts the functionality of a print processor. This object is returned by the Print System and cannot be instantiated by the end user. The object has minimal functionality.

Definition public class PrintProcessor: Filter, IDisposable

Namespace: System.Printing.PrintSubsystem
Assembly: System.Printing

Header File: PrintProcessor.hpp

Events

None

Constructors

None

Methods

PrintProcessor.Commit Method

*Definition*

```
public void Commit (
    void
);
```

*Parameters*

None

*Remarks*

*Return Value*

None

*Exceptions*

PrintProcessor.Refresh Method

*Definition*

```
public void Refresh (
    void
);
```

*Parameters*

None

*Remarks*

*Return Value*

None

*Exceptions*

Properties

None

PrintSystemAttributeValue

This is the class that abstracts a property / value pair and allows representing any type that the Print System supports through a common interface.

Definition public abstract class PrintSystemAttributeValue: IDisposable

Namespace: System.Printing.PrintSubsystem
Assembly: System.Printing

Header File: PrintSystemAttributeValue.hpp

Events

None

Constructors

PrintSystemAttributeValue. PrintSystemAttributeValue

Initialize the instance of the base PrintSystemAttributeValue class.

*Overload List*

```
public PrintSystemAttributeValue (String*);
```

*Definition*

```
public PrintSystemAttributeValue (
    String* attributeName
);
```

*Parameters*

*attributeName* : This is the name of the attribute.

*Remarks*

*Return Value*

None

*Exceptions*

Methods

PrintSystemAttributeValue.Dispose Method

*Overload List*

```
public override void Dispose (void);
protected virtual void Dispose (Boolean);
```

*Definition*

```
public override void Dispose (
    void
);
protected virtual void Dispose (
    Boolean disposing
);
```

*Parameters*

Boolean *disposing*

*Remarks*

*Return Value*

None

*Exceptions*

Properties

PrintSystemAttributeValue.Name Property

*Definition* public virtual String* Name { get; }

*Property Value*

Name of the attribute -value pair represented by this object.

This property is read-only.

*Exceptions*

None

*Applies To*

None

PrintSystemAttributeValue.Value Property

*Definition* public abstract object Value { get; set; }

*Property Value*

Value of the attribute -value pair represented by this object.

This property is read/write.

*Exceptions*

None

*Applies To*

None

PrintSystemAttributeValue.SyncRoot Property

*Definition*

```
public Object* SyncRoot { get; }
```

*Property Value*

Synchronization root for this object.

This property is read-only.

*Exceptions*

None

*Applies To*

None

PrintSystemAttributeValueDictionary

This is the class that abstracts a collection of properties associated with an object in the Printing namespace.

Definition public class PrintSystemAttributeValueDictionary: Hashtable, ICloneable, IDeserializationCallback, IDictionary, ISerializable

Namespace: System.Printing.PrintSubsystem
Assembly: System.Printing

Header File: PrintSystemAttributeValue.hpp

Events

PrintSystemAttributeValueDictionary.OnDeserialization Event

*Definition*

```
public void OnDeserialization (
    Object* sender
);
```

*Parameters*

Object* sender

*Remarks*

None

*Return Value*

None

*Exceptions*

None

Constructors

PrintSystemAttributeValueDictionary.PrintSystemAttributeValueDictionary

Creates a new instance of the PrintSystemAttributeValueDictionary class.

*Definition*

```
public PrintSystemAttributeValueDictionary (
    void
);
```

*Parameters*

None

*Remarks*

*Return Value*

None

*Exceptions*

Methods

PrintSystemAttributeValueDictionary.Add Method

Adds a PrintSystemAttributeValue to the collection represented by this object.

*Definition*

```
public void Add (
    PrintSystemAttributeValue attributeValue
);
```

*Parameters*

PrintSystemAttributeValue *attributeValue*

*Remarks*

*Return Value*

None

*Exceptions*

PrintSystemAttributeValueDictionary.CopyTo Method

Copies the attributes values from this collection to a target collection starting at a particular index.

*Definition*

```
public void CopyTo (
    PrintSystemAttributeValueDictionary collection,
    int arrayIndex
);
```

*Parameters*

PrintSystemAttributeValueDictionary *collection* int *arrayIndex*

*Remarks*

*Return Value*

None

*Exceptions*

PrintSystemAttributeValueDictionary.GetObjectData Method

*Definition*

```
public void GetObjectData (
    System::Runtime::Serialization::SerializationInfo* info,
    System::Runtime::Serialization::StreamingContext context);
```

*Parameters*

Object* sender

*Remarks*

None

*Return Value*

None

*Exceptions*

None

Properties

PrintSystemAttributeValueDictionary.this[] Property

Array of attributes held in the collection represented by this object.

*Definition*

```
public PrintSystemAttributeValue*this[string attribName]
    { get; set; }
```

*Parameters* string *attribName*

*Property Value*

This property is read/write.

*Exceptions*

None

*Applies To*

None

PrintSystemObjectPropertyChangedEventArgs

Definition public class PrintSystemObjectPropertyChangedEventArgs: EventArgs

Namespace: System.Printing.PrintSubSystem
Assembly: System.Printing

Header Files: PrintSystemNotifications.hpp

Events

None

Constructors

PrintSystemObjectPropertyChangedEventArgs. PrintSystemObjectPropertyChangedEventArgs

*Definition*

```
public PrintSystemObjectPropertyChangedEventArgs (
    String* eventName
);
```

*Parameters*

String* *eventName*

*Remarks*

*Return Value*

None

*Exceptions*

Methods

None

Properties

PrintSystemObjectPropertyChangedEventArgs.PropertyName Property

Name of the property that changed.

*Definition*

```
public String* PropertyName { get; }
```

*Property Value*

This property is read-only.

*Exceptions*

None

*Applies To*

None

PrintSystemObjectPropertiesChangedEventArgs

Definition public class PrintSystemObjectPropertiesChangedEventArgs: EventArgs

Namespace: System.Printing.PrintSubSystem
Assembly: System.Printing

Header Files: PrintSystemNotifications.hpp

Events

None

Constructors

PrintSystemObjectPropertiesChangedEventArgs. PrintSystemObjectPropertiesChangedEventArgs

*Definition* public PrintSystemObjectPropertiesChangedEventArgs (
StringCollection* *eventNames*
);

*Parameters*

StringCollection* *eventName*

*Remarks*

*Return Value*

None

*Exceptions*

Methods

None

Properties

PrintSystemObjectPropertiesChangedEventArgs.PropertyName Property

Name of the property that changed.

*Definition* public StringCollection* PropertyName { get; }

*Property Value*

This property is read-only.

*Exceptions*

None

*Applies To*

None

PrintSystemPermission

This is the class encapsulating the permissions necessary for the CAS model. It controls the ability to access any of the objects defined by the printing framework.

Definition public class PrintSystemPermission: CodeAccessPermission, IPermission, IStackWalk, IUnrestrictedPermissione

Namespace: System.Printing.PrintSubsystem
Assembly: System.Printing

Header Files: PrintSystemSecurity.hpp

Events

None

Constructors

PrintSystemPermission.PrintSystemPermission

Instantiates a new instance of the PrintSystemPermission class with the default access.

*Overload List*

```
public PrintSystemPermission (PermissionState);
public PrintSystemPermission ( PrintSystemPermissionAccess);
```

*Definition*

```
public PrintSystemPermission (
    PermissionState state
);
public PrintSystemPermission (
    PrintSystemPermissionAccess printSystemPermissionAccess
);
```

*Parameters*

PermissionState *state*

PrintSystemPermissionAccess *printSystemPermissionAccess*

*Remarks*

*Return Value*

None

*Exceptions*

Methods

PrintSystemPermission.Copy Method

Creates and returns an identical copy of the current permission.

*Definition*

```
public override IPermission Copy (
    void
);
```

*Parameters*

None

*Remarks*

*Return Value*

None

*Exceptions*

PrintSystemPermission.FromXml Method

Reconstructs a permission with a specified state from an XML encoding

*Definition*

```
public override void FromXml (
    SecurityElement securityElement
);
```

*Parameters*

SecurityElement *securityElement*

*Remarks*

*Return Value*

None

*Exceptions*

PrintSystemPermission.Intersect Method

Creates and returns a permission that is the intersection of the current permission and the specified permission

*Definition*

```
public override IPermission Intersect (
    IPermission* target
);
```

*Parameters*

IPermission *target*

*Remarks*

*Return Value*

None

*Exceptions*

PrintSystemPermission.IsSubsetOf Method

Determines whether the current permission is a subset of the specified permission.

*Definition*

```
public override Boolean IsSubsetOf (
    IPermission* target
);
```

*Parameters*

IPermission *target*

*Remarks*

*Return Value*

*Exceptions*

PrintSystemPermission.IsUnrestricted Method

Returns a value indicating whether the current permission is unrestricted.

*Definition*

```
public sealed override Boolean IsUnrestricted (
    void
);
```

*Parameters*

None

*Remarks*

*Return Value*

*Exceptions*

PrintSystemPermission.ToXml Method

Creates an XML encoding of the permission and its current state.

*Definition*

```
public override SecurityElement ToXml (
    void
);
```

*Parameters*

None

*Remarks*

*Return Value*

*Exceptions*

PrintSystemPermission.Union Method

Creates a permission that is the union of the current permission and the specified permission.

*Definition*

```
public override IPermission Union (
    IPermission* target
);
```

*Parameters*

IPermission *target*

*Remarks*

*Return Value*

*Exceptions*

Properties

PrintSystemPermission.AccessLevel Property

Gets or set the required access level for the resource

*Definition*

```
public PrintSystemPermissionAccess AccessLevel { get; set; }
```

*Property Value*

This property is read/write.

*Exceptions*

None

*Applies To*

None

PrintSystemJob

This is an Abstract class serving as a base class for the job classes. The Job class encapsulates the data in the printed job.

Definition

```
public abstract class PrintSystemJob : PrintSystsemObject, IDisposable
```

Namespace: System.Printing.PrintSubsystem
Assembly: System.Printing

Header Files: PrintSystemJob.hpp

Events

None

Constructors

None

Methods

None

Properties

PrintSystem Job.JobInfo Property

This is intended to return the Job pointer which contains this data.

*Definition*

Public virtual PrintSystemJobInfo* JobInfo{get;}

*Property Value*

This property is read-only.

*Exceptions*

None

*Applies To*

None

PrintSystemJobInfo

This class provides methods for job control and properties to access print job data. The PrintSystemJobInfo can be created for producing a spooled job or later consuming a spooled job which is usually done by the driver

Definition public class PrintSystemJobInfo: PrintSystemObject

Namespace: System.Printing.PrintSubsystem
Assembly: System.Printing

Header Files: PrintSystemJobInfo.hpp

Events

None

Constructors

None. The object is created through PrintQueue.AddJob

Methods

PrintSystemJobInfo.Add Method

Creates a print job to the given printer and of a given type. A default job jane will be given. The spool container name is generated by the Spooler service.

*Overload List*

```
static PrintSystemJobInfo* Add (PrintQueue, Type);
static PrintSystemJobInfo* Add (PrintQueue, Type, String*);
static PrintSystemJobInfo* Add (PrintQueue, Type, String*, String*);
```

*Definition*

```
static PrintSystemJobInfo Add (
    PrintQueue printQueue,
    Type jobType
);
static PrintSystemJobInfo Add (
    PrintQueue printQueue,
    Type jobType,
    String* jobName
);
static PrintSystemJobInfo Add (
    PrintQueue printQueue,
    Type jobType,
    String* jobName,
    String* jobContainerName
);
```

*Parameters*

PrintQueue *printQueue*

Type *jobType*

String* *jobName*

String* *jobContainerName*

*Remarks*

None

*Return Value*

None

*Exceptions*

PrintJobException

PrintSystemJobInfo.Get Method

Returns an existing print job the given printer and the spool container.

*Overload List*

```
static PrintSystemJobInfo Get (PrintQueue*, String*);
static PrintSystemJobInfo Get (PrintQueue*, Int64);
```

*Definition*

```
static PrintSystemJobInfo Get (
    PrintQueue* printQueue,
    String* jobContainerName
);
static PrintSystemJobInfo Get (
    PrintQueue* printQueue,
    Int64 jobIdentifier
);
```

*Parameters*

PrintQueue *printQueue*

String**jobContainerName*

Int32 *jobIdentifier*

*Remarks*

None

*Return Value*

None

*Exceptions*

PrintJobException

PrintSystemJobInfo.EndJob Method

Pauses the job.

*Definition*

```
void EndJob (
    void
);
```

*Parameters*

None

*Remarks*

None

*Return Value*

None

*Exceptions*

PrintJobException

PrintSystemJobInfo.Pause Method

Pauses the job.

*Definition*

```
void Pause (
    void
);
```

*Parameters*

None

*Remarks*

None

*Return Value*

None

*Exceptions*

PrintJobException

PrintSystemJobInfo.Resume Method

Resumes the job.

*Definition*

```
void Resume(
    void
);
```

*Parameters*

None

*Remarks*

None

*Return Value*

None

*Exceptions*

PrintJobException

PrintSystemJobInfo.Commit Method

Commits the data into the spool container.

*Definition*

```
virtual void Commit (
    void
);
```

*Parameters*

None

*Remarks*

None

*Return Value*

None

*Exceptions*

PrintJobException

PrintSystemJobInfo.Refresh Method

Refreshed data from the spool container

*Definition*

```
virtual void Refresh (
    void
);
```

*Parameters*

None

*Remarks*

None

*Return Value*

None

*Exceptions*

PrintJobException

PrintSystemJobInfo.JobStatusArray Method

*Definition*

```
PrintJobStatus JobStatusArray (
    void
)[];
```

*Parameters*

None

*Remarks*

None

*Return Value*

None

*Exceptions*

PrintJobException

Properties

PrintSystemJobInfo.JobData Property

Returns a PrintSystemJob object that this job info object is created for. This can be thought of as the real file which has the real printable data.

*Definition*
Public PrintSystemJob* JobData {get;}

*Property Value*

This property is read-only.

*Exceptions*

None

*Applies To*

None

PrintSystemJobInfo.JobType Property

Returns the Type of the PrintSystemJob object that this job info object is created for.

*Definition*
Public Type* JobType {get;}

*Property Value*

This property is read-only.

*Exceptions*

None

*Applies To*

None

PrintSystemJobInfo.JobContainerName Property

Returns the name of the spool file container associated with the print job.

*Definition*
Public String* JobContainerName {get;}

*Property Value*

This property is read-only.

*Exceptions*

None

*Applies To*

None

PrintSystemJobInfo.JobIdentifier Property

Returns the job identifier of the print job

*Definition*

Public Int32 JobIdentifier {get;}

*Property Value*

This property is read-only.

*Exceptions*

None

*Applies To*

None

PrintSystemJobInfo.Submitter Property

Returns the user name who submitted the print job.

*Definition*

Public String* Submitter {get;}

*Property Value*

This property is read-only.

*Exceptions*

None

*Applies To*

None

PrintSystemJobInfo.Priority Property

Returns the print job priority in the queue.

*Definition*
Public PrintJobPriority Priority {get;}

*Property Value*

This property is read-only.

*Exceptions*

None

*Applies To*

None

PrintSystemJobInfo.PositionInPrintQueue Property

Returns the print job position in the queue.

*Definition*
Public Int32 PositionInPrintQueue {get;}

*Property Value*

This property is read-only.

*Exceptions*

None

*Applies To*

None

PrintSystemJobInfo.StartTime Property

Returns the start time when the job must be scheduled for printing.

*Definition*
Public DateTime StartTime {get;}

*Property Value*

This property is read-only.

*Exceptions*

None

*Applies To*

None

PrintSystemJobInfo.UntilTime Property

Returns the time until the job must be scheduled for printing.

*Definition*

Public DateTime UntilTime {get;}

*Property Value*

This property is read-only.

*Exceptions*

None

*Applies To*

None

PrintSystemJobInfo.NumberOfPages Property

Returns the job's total number of pages.

*Definition*

Public Int32 NumberOfPages {get;}

*Property Value*

This property is read-only.

*Exceptions*

None

*Applies To*

None

PrintSystemJobInfo.PropertyName Property

Returns the job's number of printed pages.

*Definition*

Public Int32 NumberOfPagesPrinted {get;}

*Property Value*

This property is read-only.

*Exceptions*

None

*Applies To*

None

PrintSystemJobInfo.JobSize Property

Returns the job's size in bytes.

*Definition*

Public Int32 JobSize {get;}

*Property Value*

This property is read-only.

*Exceptions*

None

*Applies To*

None

PrintSystemJobInfo.TimeJobSubmitted Property

Returns the time when the job was submitted.

*Definition*

Public DateTime TimeJobSubmitted {get;}

*Property Value*

This property is read-only.

*Exceptions*

None

*Applies To*

None

PrintSystemJobInfo.TimeSinceStartedPrinting Property

Returns the number of seconds since the job was scheduled for printing.

*Definition*

Public Int32 TimeSinceStartedPrinting {get;}

*Property Value*

This property is read-only.

*Exceptions*

None

*Applies To*

None

PrintSystemJobInfo.JobStatus Property

Returns the job status

*Definition*

Public PrintJobStatus JobStatus {get;}

*Property Value*

This property is read-only.

*Exceptions*

None

*Applies To*

None

PrintSystemJobInfo.IsCompleted Property

*Definition*

Public Boolean IsCompleted {get;}

*Property Value*

Returns true if the job is sent to the device.

This property is read-only.

*Exceptions*

None

*Applies To*

None

PrintSystemJobInfo.IsDeleting Property

Returns true if the job is in the process of being deleted.

*Definition*

Public Boolean IsDeleting {get;}

*Property Value*

This property is read-only.

*Exceptions*

None

*Applies To*

None

PrintSystemJobInfo.IsPaused Property

*Definition*

Public Boolean IsPaused {get;}

*Property Value*

Returns true if the job is paused

This property is read-only.

*Exceptions*

None

*Applies To*

None

PrintSystemJobInfo.IsPrinted Property

*Definition*

Public Boolean IsPrinted {get;}

*Property Value*

Returns true if the job is printed

This property is read-only.

*Exceptions*

None

*Applies To*

None

PrintSystemJobInfo.IsRestarted Property

*Definition*

Public Boolean IsRestarted {get;}

*Property Value*

Returns true if the job is restarted

This property is read-only.

*Exceptions*

None

*Applies To*

None

PrintSystemJobInfo.PropertyName Property

*Definition*

Public Boolean IsSpooling {get;}

*Property Value*

Returns true if the job is spooling

This property is read-only.

*Exceptions*

None

*Applies To*

None

PrintSystemJobInfo.IsInError Property

*Definition*

Public Boolean IsInError {get;}

*Property Value*

Returns true if the job is in error state

This property is read-only.

*Exceptions*

None

*Applies To*

None

PrintSystemJobInfo.IsPrinting Property

*Definition*

Public Boolean IsPrinting {get;}

*Property Value*

Returns true if the job is printing to the device

This property is read-only.

*Exceptions*

None

*Applies To*

None

PrintSystemJobInfo.IsOffLine Property

*Definition*

Public Boolean IsOffLine {get;}

*Property Value*

Returns true if the job is offline

This property is read-only.

*Exceptions*

None

*Applies To*

None

PrintSystemJobInfo.IsPaperOut Property

*Definition*

Public Boolean IsPaperOut {get;}

*Property Value*

Returns true if the job is out of paper

This property is read-only.

*Exceptions*

None

*Applies To*

None

PrintSystemJobInfo.IsDeleted Property

*Definition*

Public Boolean IsDeleted {get;}

*Property Value*

Returns true if the job is deleted

This property is read-only.

*Exceptions*

None

*Applies To*

None

PrintSystemJobInfo.IsBlocked Property

*Definition*

Public Boolean IsBlocked {get;}

*Property Value*

Returns true if the job is blocked

This property is read-only.

*Exceptions*

None

*Applies To*

None

PrintSystemJobInfo.IsUserInterventionRequired Property

*Definition*

Public Boolean IsUserInterventionRequired {get;}

*Property Value*

Returns true if the job needs user intervention

This property is read-only.

*Exceptions*

None

*Applies To*

None

PrintSystemJobInfo.IsRetained Property

*Definition*

Public Boolean IsRetained {get;}

*Property Value*

Returns true if the job is keep after printing

This property is read-only.

*Exceptions*

None

*Applies To*

None

PrintSystemJobInfo.JobName Property

*Definition*

Public String* JobName {get;set}

*Property Value*

Returns the job name

This property is read/write

*Exceptions*

None

*Applies To*

None

PrintSystemJobInfo.HostingPrintQueue Property

Returns the print queue that the job is created for

*Definition*

Public PrintQueue* HostingPrintQueue {get;}

*Property Value*

This property is read-only.

*Exceptions*

None

*Applies To*

None

PrintSystemJobInfo.HostingPrintServer Property

Returns the print server of the print queue that the job is created for

*Definition*

Public PrintServer* HostingPrintServer {get;}

*Property Value*

This property is read-only.

*Exceptions*

None

*Applies To*

None

PrintSystemDocument

Definition public class PrintSystemDocument: PrintSystemResourceContainer, IDisposable

Namespace: System.Printing.PrintSubsystem
Assembly: System.Printing

Header Files: PrintSystemDocument.hpp

Events

None

Constructors

None

Methods

PrintSystemDocument.GetStream Method

Returns a stream that allows reading/writing the document data into the compound file

*Definition*

```
virtual Stream*GetStream (
    void
);
```

*Parameters*

None

*Remarks*

None

*Return Value*

None

*Exceptions*

None

PrintSystemDocument.Commit Method

Commits the in memory data into the compound file document stream

*Definition*

```
virtual void Commit(
    void
);
```

*Parameters*

None

*Remarks*

None

*Return Value*

None

*Exceptions*

IOException

PrintSystemDocument.Refresh Method

Refreshes the in memory data into from the compound file document stream

*Definition*

```
virtual void Refresh (
    void
);
```

*Parameters*

None

*Remarks*

None

*Return Value*

None

*Exceptions*

IOException

PrintSystemDocument.AddRendition Method

Creates a new rendition and adds it to the document

*Definition*

```
PrintSystemRendition AddRendition (
    String*renditionName
);
```

*Parameters*

String*renditionName

*Remarks*

None

*Return Value*

None

*Exceptions*

PrintJobException

PrintSystemDocument.GetRendition Method

Returns an existing rendition from the current document

*Definition*

```
public PrintSystemRendition GetRendition (
    String*renditionName
);
```

*Parameters*

String**renditionName*

*Remarks*

None

*Return Value*

None

*Exceptions*

PrintJobException

Properties

PrintSystemDocument.Uri Property

It returns the String Uri of the document

*Definition*

```
Public virtual String*Uri {get;}
```

*Property Value*

This property is read-only.

*Exceptions*

None

*Applies To*

None

PrintSystemDocument.JobTicket Property

It returns the document's JobTicket.

*Definition*

Public virtual Stream*JobTicket {get;set}

*Property Value*

This property is read/write.

*Exceptions*

None

*Applies To*

None

PrintSystemDocument.RenditionCollection Property

It returns the collection of renditions that this document holds.

*Definition*

Public virtual PrintSystemRenditionCollection RenditionCollection {get; }

*Property Value*

This property is read-only.

*Exceptions*

None

*Applies To*

None

PrintSystemDocumentCollection

This is a class representing the collection of Documents contained within an eDocument Print Job.

Definition public class PrintSystemDocumentCollection: PrintSystemObjects, IEnumerable, IDisposable

Namespace: System.Printing.PrintSubsystem
Assembly: System.Printing

Header Files: PrintSystemDocument.hpp

Events

None

Constructors

PrintSystemDocumentCollection.PrintSystemDocumentCollection

*Overload List* public PrintSystemDocumentCollection ();

public PrintSystemDocumentCollection (PrintSystemEDocumentJob*);

*Definition*

```
public PrintSystemDocumentCollection(
    void
);
public PrintSystemDocumentCollection(
    PrintSystemEDocumentJob* job
);
```

*Parameters*

None

*Remarks*

None

*Return Value*

None

*Exceptions*

None

Methods

PrintSystemDocumentCollection.Dispose Method

*Definition*

```
void Dispose (
    void
);
```

*Parameters*

None

*Remarks*

None

*Return Value*

None

*Exceptions*

None

PrintSystemDocumentCollection.GetEnumerator Method

*Definition*

```
IEnumerator* GetEnumerator(
    void
);
```

*Parameters*

None

*Remarks*

None

*Return Value*

None

*Exceptions*

None

PrintSystemDocumentCollection.Add Method

*Definition*

```
void Add(
    PrintSystemObject* document
);
```

*Parameters*

None

*Remarks*

None

*Return Value*

None

*Exceptions*

None

Properties

PrintSystemDocumentCollection.SyncRoot Property

*Definition*

```
public Object* SyncRoot { get; }
```

*Property Value*

Synchronization root for this object.

This property is read-only.

*Exceptions*

None

*Applies To*

None

PrintSystemRendition

Definition public class PrintSystemRendition: PrintSystemResourceContainer, IDisposable

Namespace: System.Printing.PrintSubsystem
Assembly: System.Printing

Header Files: PrintSystemRendition.hpp

Events

None

Constructors

None

Methods

PrintSystemRendition.GetStream Method

Returns a stream that allows reading/writing the rendition data into the compound file

*Definition*

```
virtual Stream GetStream(
    void
);
```

*Parameters*

None

*Remarks*

None

*Return Value*

None

*Exceptions*

None

PrintSystemRendition.Commit Method

Commits the in memory data into the compound file document stream

*Definition*

```
virtual void Commit (
    void
);
```

*Parameters*

None

*Remarks*

None

*Return Value*

None

*Exceptions*

None

PrintSystemRendition.Refresh Method

Refreshes the in memory data into from the compound file document stream

*Definition*

```
virtual void Refresh (
    void
);
```

*Parameters*

None

*Remarks*

None

*Return Value*

None

*Exceptions*

IOException

PrintSystemRendition.AddPage Method

Creates a new page and adds it to the current rendition

*Definition*

```
public PrintSystemPage AddPage (
    String*pageTag
);
```

*Parameters*

String**pageTag*

*Remarks*

None

*Return Value*

None

*Exceptions*

PrintJobException

PrintSystemRendition.GetPage Method

Returns an existing page from the current rendition

*Definition*

```
PrintSystemPage GetPage (
    String*pageTag
);
```

*Parameters*

*pageTag*: the name of the page

*Remarks*

None

*Return Value*

None

*Exceptions*

PrintJobException

Properties

PrintSystemRendition.Uri Property

It returns the String Uri of the rendition.

*Definition*

Public virtual String*Uri {get;}

*Property Value*

This property is read-only.

*Exceptions*

None

*Applies To*

None

PrintSystemRendition.JobTicket Property

It returns the rendition's JobTicket.

*Definition*

Public virtual Stream JobTicket {get;set}

*Property Value*

This property is read/write.

*Exceptions*

None

*Applies To*

None

PrintSystemRendition.PageCollection Property

It returns the collection of pages that this rendition holds.

*Definition* public virtual PrintSystemPageCollection* PageCollection {get }

*Property Value*

This property is read-only.

*Exceptions*

None

*Applies To*

None

PrintSystemRenditionCollection

Each Document consists of a number of renditions. This is the collections of renditions contained within the document.

Definition public class PrintSystemRenditionCollection: PrintSystemObjects, IEnumerable, IDisposable

Namespace: System.Printing.PrintSubsystem
Assembly: System.Printing

Header Files: PrintSystemRendition.hpp

Events

None

Constructors

None

Methods

PrintSystemRenditionCollection.Dispose Method

*Definition*

```
void Dispose(
    void
);
```

*Parameters*

None

*Remarks*

None

*Return Value*

None

*Exceptions*

None

PrintSystemRenditionCollection.Add Method

*Definition*

```
void Add(
    PrintSystemObject* rendition
);
```

*Parameters*

None

*Remarks*

None

*Return Value*

None

*Exceptions*

None

PrintSystemRenditionCollection.GetEnumerator Method

*Definition*

```
IEnumerator* GetEnumerator(
    void
);
```

*Parameters*

None

*Remarks*

None

*Return Value*

None

*Exceptions*

None

Properties

PrintSystemRenditionCollection.SyncRoot Property

*Definition* public Object* SyncRoot { get; }

*Property Value*

Synchronization root for this object.

This property is read-only.

*Exceptions*

None

*Applies To*

None

PrintSystemPage

This is the page contained within the rendition.

Definition public class PrintSystemPage: PrintSystemObject, IDisposable

Namespace: System.Printing.PrintSubsystem
Assembly: System.Printing

Header Files: PrintSystemPage.hpp

Events

None

Constructors

None

Methods

PrintSystemPage.GetStream Method

Returns a stream that allows reading/writing the page data into the compound file

*Definition*

```
virtual Stream* GetStream (
    void
);
```

*Parameters*

None

*Remarks*

None

*Return Value*

None

*Exceptions*

None

PrintSystemPage.Commit Method

Commits the in memory data into the compound file document stream

*Definition*

```
Virtual void Commit (
    void
);
```

*Parameters*

None

*Remarks*

None

*Return Value*

None

*Exceptions*

IOException

PrintSystemPage.Refresh Method

Refreshes the in memory data from the compound file document stream

*Definition*

```
virtual void Refresh (
    void
);
```

*Parameters*

None

*Remarks*

None

*Return Value*

None

*Exceptions*

IOException

Properties

PrintSystemPage.Uri Property

It returns the String Uri of the page.

*Definition*

```
Public virtual String* Uri {get;}
```

*Property Value*

This property is read-only.

*Exceptions*

None

*Applies To*

None

PrintSystemRendition.JobTicket Property

It returns the page's JobTicket.

*Definition*

Public virtual Stream* JobTicket {get;set}

*Property Value*

This property is read/write.

*Exceptions*

None

*Applies To*

None

PrintSystemPageCollection

Each Rendition has a collection of pages. This is the collections encapsulating those pages

Definition public class PrintSystemPageCollection: PrintSystemObjects, IEnumerable, IDisposable

Namespace: System.Printing.PrintSubsystem
Assembly: System.Printing

Header Files: PrintSystemPage.hpp

Events

None

Constructors

None

Methods

PrintSystemPageCollection.Dispose Method

*Definition*

```
void Dispose(
    void
);
```

*Parameters*

None

*Remarks*

None

*Return Value*

None

*Exceptions*

None

PrintSystemPageCollection.Add Method

*Definition*

```
void Add(
    PrintSystemObject* rendition
);
```

*Parameters*

None

*Remarks*

None

*Return Value*

None

*Exceptions*

None

PrintSystemPageCollection.GetEnumerator Method

*Definition*

```
IEnumerator* GetEnumerator(
    void
);
```

*Parameters*

None

*Remarks*

None

*Return Value*

None

*Exceptions*

None

Properties

PrintSystemPageCollection.SyncRoot Property

*Definition*

```
public Object* SyncRoot { get; }
```

*Property Value*

Synchronization root for this object.

This property is read-only.

*Exceptions*

None

*Applies To*

None

PrintSystemResourceContainer

Definition public class PrintSystemResourceContainer: PrintSystemObject

Namespace: System.Printing.PrintSubsystem
Assembly: System.Printing

Header File: PrintSystemDocument.hpp

Constructors

None

Events

None

Methods

PrintSystemResourceContainer.AddResource Method

*Definition*

```
PrintSystemEDocumentResource* AddResource (
    Type* resourceType,
    String* resourceName
);
```

*Parameters*

Type* *resourceType*

String* *resourceName*

*Remarks*

None

*Return Value*

None

*Exceptions*

None

PrintSystemResourceContainer.GetResource Method

*Definition*

```
PrintSystemEDocumentResource* GetResource (
    Type* resourceType,
    String* resourceName
);
```

*Parameters*

Type* *resourceType*

String* *resourceName*

*Remarks*

None

*Return Value*

None

*Exceptions*

None

PrintSystemResourceContainer.AddFont Method

*Definition*

```
PrintSystemFont* AddFont (
    String* fontName
);
```

*Parameters*

None

*Remarks*

None

*Return Value*

None

*Exceptions*

None

PrintSystemResourceContainer.GetFont Method

*Definition*

```
PrintSystemFont* GetFont (
    String* fontName
);
```

*Parameters*

None

*Remarks*

None

*Return Value*

None

*Exceptions*

None

PrintSystemResourceContainer.AddImage Method

*Definition*

```
PrintSystemImage* AddImage (
    String* imageName
);
```

*Parameters*

None

*Remarks*

None

*Return Value*

None

*Exceptions*

None

PrintSystemResourceContainer.GetImage Method

*Definition*

```
PrintSystemImage* GetImage (
    String* imageName
);
```

*Parameters*

None

*Remarks*

None

*Return Value*

None

*Exceptions*

None

Properties

PrintSystemResourceContainer.EDocumentResourceCollection Property

*Definition*

```
public PrintSystemEDocumentResourceCollection*
    EDocumentResourceCollection { get;}
```

*Property Value*

This property is read-only.

*Exceptions*

None

*Applies To*

None

PrintSystemResourceContainer.ImageCollection Property

*Definition* public PrintSystemImageCollection* ImageCollection {get; }

*Property Value*

This property is read-only.

*Exceptions*

None

*Applies To*

None

PrintSystemResourceContainer. FontCollection Property

*Definition* public PrintSystemFontCollection* FontCollection { get; }

*Property Value*

This property is read-only.

*Exceptions*

None

*Applies To*

None

PrintSystemEDocumentJob

Print Job class that encapsulates the functionality the functionality of eDocument Data. In other words it understands the hierarchy and format of an eDocument spool file.

Definition public class PrintSystemEDocumentJob: PrintSystemJob, IDisposable

Namespace: System.Printing.PrintSubsystem
Assembly: System.Printing

Header File: PrintSystemDocumentJob.hpp

Constructors

None

Events

None

Methods

PrintSystemEDocumentJob.AddDocument Method

*Definition*

```
PrintSystemDocument* AddDocument (
    String* documentName
);
```

*Parameters*

String* *documentName*

*Remarks*

None

*Return Value*

PrintSystemDocument

*Exceptions*

PrintJobException

PrintSystemEDocumentJob.GetStream Method

Returns a stream that allows reading/writing the job specific data into the compound file

*Definition*

```
Virtual Stream GetStream(
    void
);
```

*Parameters*

None

*Remarks*

None

*Return Value*

Stream

None

*Exceptions*

None

PrintSystemEDocumentJob.Commit Method

Commits the in memory data into the compound file document streams

*Definition*

```
Virtual void Commit (
    void
);
```

*Parameters*

None

*Remarks*

None

*Return Value*

None

*Exceptions*

IOException

PrintSystemEDocumentJob.Refresh Method

*Definition*

```
Virtual void Refresh (
    void
);
```

*Parameters*

None

*Remarks*

None

*Return Value*

None

*Exceptions*

IOException

PrintSystemEDocumentJob.MethodName Method

Creates a new document in the job hierarchy. This also follows the hierarchy explained in the diagram above.

*Definition*

```
PrintSystemDocument AddDocument (
    String*documentName
);
```

*Parameters*

String**documentName*

*Remarks*

None

*Return Value*

PrintSystemDocument

*Exceptions*

PrintJobException

PrintSystemEDocumentJob.GetDocument Method

Returns an existing document from the current Job

*Definition*

```
PrintSystemDocument* GetDocument (
    String* documentName
);
```

*Parameters*

String* *documentName*

*Remarks*

None

*Return Value*

PrintSystemDocument

*Exceptions*

PrintJobException

PrintSystemEDocumentJob.AddResource Method

Creates a new resource to the Job and adds that to the job

*Definition*

```
PrintSystemResource* AddResource (
    Type* resourceType,
    String* resourcetName
);
```

*Parameters*

Type *resourceType*

String**resourcetName*

*Remarks*

None

*Return Value*

PrintSystemResource

*Exceptions*

PrintJobException

PrintSystemEDocumentJob.MethodName Method

Returns an existing resource from the current Job

*Definition*

```
PrintSystemResource GetResource (
    Type   resourceType,
    String* resourceName
);
```

*Parameters*

Type *resourceType*

String* *resourceName*

*Remarks*

None

*Return Value*

PrintSystemResource

*Exceptions*

PrintJobException

PrintSystemEDocumentJob.AddFont Method

Creates a new font to the Job and adds that to the job

*Definition*

```
PrintSystemFont* AddFont (
    String* fontName
);
```

*Parameters*

String* *fontName*

*Remarks*

None

*Return Value*

PrintSystemFont

*Exceptions*

PrintJobException

PrintSystemEDocumentJob.GetFont Method

Returns an existing font from the current document

*Definition*

```
PrintSystemFont* GetFont (
    String* fontName
);
```

*Parameters*

String* *fontName*

*Remarks*

None

*Return Value*

PrintSystemFont

*Exceptions*

PrintJobException

PrintSystemEDocumentJob.AddImage Method

*Definition*

```
PrintSystemImage* AddImage (
    String* imageName
);
```

*Parameters*

String* *imageName*

*Remarks*

None

*Return Value*

None

*Exceptions*

PrintJobException

PrintSystemEDocumentJob.GetImage Method

*Definition*

```
PrintSystemImage* GetImage (
    String* imageName
);
```

*Parameters*

String* *imageName*

*Remarks*

None

*Return Value*

PrintSystemFont

*Exceptions*

PrintJobException

Properties

PrintSystemEDocumentJob.Name Property

It returns the eDocument job 's name.

*Definition*

Public virtual String*Name {get; set;}

*Property Value*

This property is read/write.

*Exceptions*

None

*Applies To*

None

PrintSystemEDocumentJob.FileName Property

It returns the eDocument job 's spool container path.

*Definition*

Public virtual String*FileName {get;}

*Property Value*

This property is read-only.

*Exceptions*

None

*Applies To*

None

PrintSystemEDocumentJob.JobTicket Property

It returns the eDocument job 's JobTicket.

*Definition*

Public virtual Stream* JobTicket {get;set}

*Property Value*

This property is read/write.

*Exceptions*

None

*Applies To*

None

PrintSystemEDocumentJob.DocumentCollection Property

It returns the collection of documents that this job type holds. You can refer to the diagram which explains the hierarchies of the spool file to understand how this works.

*Definition*

Public virtual PrintSystemDocumentCollection* DocumentCollection {get;}

*Property Value*

This property is read-only.

*Exceptions*

None

*Applies To*

None

PrintSystemEDocumentJob.PropertyName.FontCollection

It returns the collection of fonts that this job holds. Same as explained above

*Definition*

Public virtual PrintSystemFontCollection* FontCollection {get;}

*Property Value*

This property is read-only.

*Exceptions*

None

*Applies To*

None

PrintSystemEDocumentJob.ImageCollection Property

It returns the collection of images that this job holds. Same as explained above

*Definition*

Public virtual PrintSystemImageCollection* ImageCollection {get; }

*Property Value*

This property is read-only.

*Exceptions*

None

*Applies To*

None

PrintSystemEDocumentJob.EDocumentResourceCollection Property

It returns the collection of generic resources that this job holds. Same as explained above

*Definition*

Public virtual PrintSystemEDocumentResourceCollection EDocumentResourceCollection {get; }

*Property Value*

This property is read-only.

*Exceptions*

None

*Applies To*

None

PrintSystemEDocumentResource

This encapsulates the general resource type within a document. It allows writing/reading resources to a compound document. The resource's object type is also serialized in the stream.

Definition public class PrintSystemEDocumentResource: PrintSystemException, ISerializable

Namespace: System.Printing.PrintSubsystem
Assembly: System.Printing

Header File: PrintSystemEDocumentResource.hpp

Events

None

Constructors

None

Methods

PrintSystemEDocumentResource.RelativeUri Method

Given an Uri, it calculates the relative path to the current object.

*Definition*

```
public String* RelativeUri (
    String* inUri
);
```

*Parameters*

String**inUri*

*Remarks*

None

*Return Value* relative Uri path to the input parameter

*Exceptions*

None

PrintSystemEDocumentResource.GetStream Method

Returns a stream that allows reading/writing the resource into the compound file

*Definition*

```
virtual Stream* GetStream (
    void
);
```

*Parameters*

None

*Remarks*

None

*Return Value*

None

*Exceptions*

None

PrintSystemEDocumentResource.Commit Method

Commits the in memory data into the compound file document stream

*Definition*

```
virtual void Commit (
    void
);
```

*Parameters*

None

*Remarks*

None

*Return Value*

None

*Exceptions*

IOException

PrintSystemEDocumentResource.Refresh Method

Refreshes the in memory data into from the compound file document stream

*Definition*

```
virtual void Refresh (
    void
);
```

*Parameters*

None

*Remarks*

None

*Return Value*

None

*Exceptions*

IOException

Properties

PrintSystemEDocumentResource.Type Property

It returns the Type of the current resource.

*Definition*

Public virtual Type Type {get;}

*Property Value*

This property is read-only.

*Exceptions*

None

*Applies To*

None

PrintSystemEDocumentResource.Uri Property

*Definition*

Public virtual String*Uri {get;}

*Property Value*

This property is read-only.

*Exceptions*

None

*Applies To*

None

PrintSystemEDocumentResourceCollection

Collection of PrintSystemEDocumentResource objects that is returned as a property of PrintSystemEDocumentJob

Definition public class PrintSystemEDocumentResourceCollection: PrintSystemObjects, IEnumerable, IDisposable

Namespace: System.Printing.PrintSubsystem
Assembly: System.Printing

Header File: PrintSystemEDocumentResource.hpp

Events

None

Constructors

None

Methods

PrintSystemEDocumentResourceCollection.GetEnumerator Method

*Definition*

```
IEnumerator* GetEnumerator(
    void
);
```

*Parameters*

None

*Remarks*

None

*Return Value*

None

*Exceptions*

None

Properties

None

PrintSystemFont

A font is a special type of a resource. For simplicity of usage, we introduced this Font class to encapsulate a resource of Font Type.

Definition public class PrintSystemFont: PrintSystemEDocumentResource

Namespace: System.Printing.PrintSubsystem
Assembly: System.Printing

Header File: PrintSystemFont.hpp

Events

None

Constructors

None

Methods

PrintSystemFont.GetStream Method

Returns a stream that allows reading/writing the font into the compound file

*Definition*

```
Stream* GetStream (
    void
);
```

*Parameters*

None

*Remarks*

None

*Return Value*

None

*Exceptions*

None

PrintSystemFont.Commit Method

Commits the in memory data into the compound file document stream

*Definition*

```
void Commit (
    void
);
```

*Parameters*

None

*Remarks*

None

*Return Value*

None

*Exceptions*

IOException

PrintSystemFont.Refresh Method

Refreshes the in memory data into from the compound file document stream

*Definition*

```
void Refresh (
    void
```

```
);
```

*Parameters*

None

*Remarks*

None

*Return Value*

None

*Exceptions*

IOException

Properties

PrintSystemFont.Type Property

It returns the Type of the current resource. Inherits from PrintSystemEDocumentResource.

*Definition*

Public virtual Type Type {get;}

*Property Value*

This property is read-only.

*Exceptions*

None

*Applies To*

None

PrintSystemFont.Uri Property

Inherits from PrintSystemEDocumentResource.

*Definition*

Public virtual String*Uri {get;}

*Property Value*

This property is read-only.

*Exceptions*

None

*Applies To*

None

PrintSystemFontCollection

This is the collection of Fonts contained at any applicable level in the Job hierarchy

Definition public class PrintSystemFontCollection: PrintSystemObjects, IEnumerable, IDisposable

Namespace: System.Printing.PrintSubsystem
Assembly: System.Printing

Header File: PrintSystemFont.hpp

Events

None

Constructors

PrintSystemFontCollection. PrintSystemFontCollection

*Overload List*

PrintSystemFontCollection();

PrintSystemFontCollection(PrintSystemEDocumentJob*);

*Definition* public PrintSystemFontCollection(
    void
);
public PrintSystemFontCollection(
    PrintSystemEDocumentJob* *job*

```
);
```

*Parameters*

PrintSystemEDocumentJob* *job*

*Remarks*

None

*Return Value*

None

*Exceptions*

None

Methods

PrintSystemFontCollection.GetEnumerator Method

*Definition*

```
IEnumerator* GetEnumerator(
    void
);
```

*Parameters*

None

*Remarks*

None

*Return Value*

None

*Exceptions*

None

PrintSystemFontCollection.Add Method

*Definition*

```
void Add (
    void
);
```

*Parameters*

None

*Remarks*

None

*Return Value*

None

*Exceptions*

None

Properties

PrintSystemFontCollection.SyncRoot Property

*Definition*

```
public Object* SyncRoot { get; }
```

*Property Value*

Synchronization root for this object.

This property is read-only.

*Exceptions*

None

*Applies To*

None

PrintSystemImage

An Image is a special type of a resource. For simplicity of usage, we introduced this Image class to encapsulate a resource of Image Type.

Definition public class PrintSystemImage: PrintSystemEDocumentResource

Namespace: System.Printing.PrintSubsystem
Assembly: System.Printing

Header File: PrintSystemImage.hpp

Events

None

Constructors

None

Methods

PrintSystemImage.GetStream Method

Returns a stream that allows reading/writing the resource into the compound file

*Definition*

```
virtual Stream GetStream (
    void
);
```

*Parameters*

None

*Remarks*

None

*Return Value*

None

*Exceptions*

None

PrintSystemImage.Commit Method

Commits the properties associates with the object into the compound file document stream

*Definition*

```
virtual void Commit (
    void
);
```

*Parameters*

None

*Remarks*

None

*Return Value*

None

*Exceptions*

IOException

PrintSystemImage.Refresh Method

Refreshes the properties associates with the object from the compound file document stream.

Not implemented

*Definition*

```
virtual void Refresh (
    void
);
```

*Parameters*

None

*Remarks*

None

*Return Value*

None

*Exceptions*

IOException

Properties

None

PrintSystemImageCollection

This is the collection of Images contained at any applicable level in the Job hierarchy

Definition public class PrintSystemImageCollection: PrintSystemObjects, IEnumerable, IDisposable

Namespace: System.Printing.PrintSubsystem
Assembly: System.Printing

Header File: PrintSystemImage.hpp

Events

None

Constructors

PrintSystemImageCollection.PrintSystemImageCollection

*Overload List*

PrintSystemImageCollection ();

PrintSystemImageCollection (PrintSystemEDocumentJob*);

*Definition* public PrintSystemImageCollection (
void

```
);
public PrintSystemImageCollection (
   PrintSystemEDocumentJob* job
);
```

*Parameters*

PrintSystemEDocumentJob* *job*

*Remarks*

None

*Return Value*

None

*Exceptions*

None

Methods

PrintSystemImageCollection.Dispose Method

*Definition*

```
void Dispose(
   void
);
```

*Parameters*

None

*Remarks*

None

*Return Value*

None

*Exceptions*

None

PrintSystemImageCollection.GetEnumerator Method

*Definition*

```
IEnumerator* GetEnumerator(
    void
);
```

*Parameters*

None

*Remarks*

None

*Return Value*

None

*Exceptions*

None

PrintSystemImageCollection.Add Method

*Definition*

```
void Add (
    PrintSystemObject* resource
);
```

*Parameters*

None

*Remarks*

None

*Return Value*

None

*Exceptions*

None

Properties

PrintSystemImageCollection.SyncRoot Property

*Definition* public Object* SyncRoot { get; }

*Property Value*

Synchronization root for this object.

This property is read-only.

*Exceptions*

None

*Applies To*

None

AsyncNotifyChannel

Notification channel class that allows sending notifications to the Spooler Service in response to receiving notifications.

Definition public class AsyncNotifyChannel: IDisposable

Namespace: System.Printing.PrintSubsystem.AsyncNotify
Assembly: System.Printing

Header File:

Events

None

Constructors

None

Methods

AsyncNotifyChannel.Send Method

Sends a notification

*Definition*

```
Boolean Send (
    AsyncNotificationData notificationData
);
```

*Parameters*

AsyncNotificationData *notificationData*

*Remarks*

None

*Return Value*

None

*Exceptions*

None

AsyncNotifyChannel.Close Method

Sends a notification and closes the channel

*Definition*

```
Boolean Close (
    AsyncNotificationData*      notificationData
);
```

*Parameters*

AsyncNotificationData* *notificationData*

*Remarks*

None

*Return Value*

None

*Exceptions*

None

Properties

None

AsynchronousNotificationsSubscription

Abstract Subscription class that allows application to register for notifications sent by the Spooler service for print queues.

Definition public abstract class AsynchronousNotificationsSubscription: IDisposable

Namespace: System.Printing.PrintSubsystem.AsyncNotify
Assembly: System.Printing

Header File:

Events

None

Constructors

None

Methods

None

Properties

AsynchronousNotificationsSubscription.NotificationDataType Property

Returns the GUID that identifies the notification type.

*Definition*

System.Guid NotificationDataType {get;}

*Property Value*

This property is read-only.

*Exceptions*

None

*Applies To*

None

AsynchronousNotificationsSubscription.PrintSystemObject Property

Returns a PrintSystemObject object that this subscription is made for.

*Definition*

Public PrintSystemObject PrintSystemObject {get;}

*Property Value*

This property is read-only.

*Exceptions*

None

*Applies To*

None

AsynchronousNotificationsSubscription.UserNotificationFilter Property

Returns the type of UserNotificationFilter that this subscription is made for.

*Definition*

UserNotificationFilter UserNotificationFilter {get;}

*Property Value*

The type can be:

```
value public enum UserNotificationFilter
{
PerUserFilter = 1
AllUsers      = 2
};
```

This property is read-only.

*Exceptions*

None

*Applies To*

None

AsynchronousNotificationsSubscription.NotificationDataType Property

Returns the GUID that identifies the notification type.

*Definition*

System.Guid NotificationDataType {get;}

*Property Value*

This property is read-only.

*Exceptions*

None

*Applies To*

None

BidirectionalAsynchronousNotificationsSubscription

Subscription class that allows application to register for bidirectional notifications sent by the Spooler service for print queues.

Definition public class BidirectionalAsynchronousNotificationsSubscription: AsynchronousNotificationsSubscription

Namespace: System.Printing.PrintSubsystem.AsyncNotify
Assembly: System.Printing

Header File:

Events

BidirectionalAsynchronousNotificationsSubscription.NotifyOnBidirectionalNotificationEventHandler Event

*Definition*

```
delegate void NotifyOnBidirectionalNotificationEventHandler (
    Object sender,
    BidirectionalNotificationEventArgs* e
);
```

*Parameters*

Object *sender*

BidirectionalNotificationEventArgs* *e*

*Remarks*

NotifyOnBidirectionalNotificationEventHandler*
BidirectionalNotificationArrived

*Return Value*

None

*Exceptions*

None

Constructors

None

Methods

None

Properties

BidirectionalAsynchronousNotificationsSubscription.PrintSystemObject Property Returns a PrintSystemObject object that this subscription is made for.

*Definition*

```
Public PrintSystemObject PrintSystemObject {get;}
```

*Property Value*

This property is read-only.

*Exceptions*

None

*Applies To*

None

BidirectionalAsynchronousNotificationsSubscription.UserNotificationFilter Property Returns the type of UserNotificationFilter that this subscription is made for.

*Definition*

UserNotificationFilter UserNotificationFilter {get;}

*Property Value*

```
value public enum UserNotificationFilter
   {
   PerUserFilter = 1,
   AllUsers      = 2
   };
```

This property is read-only.

*Exceptions*

None

*Applies To*

None

BidirectionalAsynchronousNotificationsSubscription.NotificationDataType Property Returns the GUID that identifies the notification type.

*Definition*

System.Guid NotificationDataType {get;}

*Property Value*

This property is read-only.

*Exceptions*

None

*Applies To*

None

AsyncNotificationData

Object that encapsulates the notification data.

Definition public class AsyncNotificationData: IDisposable

Namespace: System.Printing.PrintSubsystem.AsyncNotify
Assembly: System.Printing

Header File:

Events

None

Constructors

AsyncNotificationData.AsyncNotificationData Method

*Definition*

Public AsyncNotificationData (
Stream *notificationDataStream*,
System.Guid *notificationDataType*
);

*Parameters*

*Remarks*

None

*Return Value*

None

*Exceptions*

None

Methods

None

Properties

AsyncNotificationData.DataStream Property

*Definition*

Stream DataStream {get;}

*Property Value*

Returns a memory Stream to the notification data

This property is read-only.

*Exceptions*

None

*Applies To*

None

AsyncNotificationData.DataType Property

*Definition*

System.Guid DataType {get;}

*Property Value*

Returns the GUID that identifies the notification type.

This property is read-only.

*Exceptions*

None

*Applies To*

None

UnidirectionalAsynchronousNotificationsSubscription

Subscription class that allows application to register for Unidirectional notifications sent by the Spooler service for print queues.

Definition public class UnidirectionalAsynchronousNotificationsSubscription: AsynchronousNotificationsSubscription

Namespace: System.Printing.PrintSubsystem.AsyncNotify
Assembly: System.Printing

Header File:

Events

UnidirectionalAsynchronousNotificationsSubscription.NotifyOnUnidirectionalNotificationEventHandler Method

*Definition*

```
delegate void NotifyOnUnidirectionalNotificationEventHandler (
    Object sender,
    UnidirectionalNotificationEventArgs* e
);
```

*Parameters*

*Remarks*

NotifyOnUnidirectionalNotificationEventHandler*
UnidirectionalNotificationArrived;

*Return Value*

None

*Exceptions*

None

Constructors

None

Methods

None

Properties

UnidirectionalAsynchronousNotificationsSubscription.PrintSystemObject Property Returns a PrintSystemObject object that this subscription is made for.

*Definition*

Public PrintSystemObject PrintSystemObject {get;}

*Property Value*

This property is read-only.

*Exceptions*

None

*Applies To*

None

UnidirectionalAsynchronousNotificationsSubscription.UserNotificationFilter Property Returns the type of UserNotificationFilter that this subscription is made for.

*Definition*

UserNotificationFilter UserNotificationFilter {get;}

*Property Value*

```
value public enum UserNotificationFilter
{
PerUserFilter = 1,
AllUsers = 2
};
```

This property is read-only.

*Exceptions*

None

*Applies To*

None

UnidirectionalAsynchronousNotificationsSubscription.NotificationDataType Property Returns the GUID that identifies the notification type.

*Definition*

System.Guid NotificationDataType {get;}

*Property Value*

This property is read-only.

*Exceptions*

None

*Applies To*

None

UnidirectionalNotificationEventArgs

EventArgs class that calls into the registered delegates when a notification comes from Spooler.

Definition public class UnidirectionalNotificationEventArgs: EventArgs

Namespace: System.Printing.PrintSubsystem.AsyncNotify
Assembly: System.Printing

Header File:

Events

None

Constructors

None

Methods

None

Properties

UnidirectionalNotificationEventArgs.Notification Property

Returns the notification object.

*Definition*

AsyncNotificationData Notification {get;}

*Property Value*

This property is read-only.

*Exceptions*

None

*Applies To*

None

BidirectionalNotificationEventArgs

EventArgs class that calls into the registered delegates when a bidirectonal channel is created.

Definition public class UnidirectionalNotificationEventArgs: EventArgs

Namespace: System.Printing.PrintSubsystem.AsyncNotify
Assembly: System.Printing

Header File:

Events

None

Constructors

None

Methods

None

Properties

BidirectionalNotificationEventArgs.Channel Property

Returns the newly created channel object.

*Definition*

AsyncNotifyChannel Channel{get;}

*Property Value*

This property is read-only.

*Exceptions*

None

*Applies To*

None

BidirectionalNotificationEventArgs.Notification Property

Returns the notification object.

*Definition*

AsyncNotificationData Notification {get;}

*Property Value*

This property is read-only.

*Exceptions*

None

*Applies To*

None

BidirectionalNotificationEventArgs.IsChannelClosed Property

Returns true if the channel was closed

*Definition*

Boolean IsChannelClosed {get;}

*Property Value*

This property is read-only.

*Exceptions*

None

*Applies To*

None

PrintSystemException

The base class for all exception classes in the Printing namespace.

Definition public class PrintSystemException: SystemException, ISerializable

Namespace: System.Printing.PrintSubsystem
Assembly: System.Printing

Header File: PrintSystemException.hpp

Events

None

Constructors

PrintSystemException.PrintSystemException

Creates a new instance of the PrintSystemException class.

*Overload List* public PrintSystemException ( void);

public PrintSystemException (String*);

public PrintSystemException (String*, Exception);

protected PrintSystemException (SerializationInfo, StreamingContext);

*Definition* public PrintSystemException (
void

```
);
public PrintSystemException (
    String* message
);
public PrintSystemException (
    String* message,
    Exception innerException
);
protected PrintSystemException (
    SerializationInfo info,
    StreamingContext context
);
```

*Parameters*

String* *message*

Exception *innerException*

SerializationInfo *info*

StreamingContext *context*

*Remarks*

The message must be a string resource key.

Default message: Print System exception.

*Return Value*

HResult: HRESULT_FROM_WIN32 ( PrinterHResult::PrintSystemGenericError)

*Exceptions*

Methods

PrintSystemException.GetObjectData Method

*Definition*

```
public override void GetObjectData (
    SerializationInfo* info,
    StreamingContext context
);
```

*Parameters*

SerializationInfo *info*

StreamingContext *context*

*Remarks*

*Return Value*

None

*Exceptions*

PrintSystemException.GetMessageFromResource Method

*Overload List* protected static String* GetMessageFromResource (
String*);

protected static String* GetMessageFromResource (
int, String*);

*Definition*

```
protected static String* GetMessageFromResource (
    String* resourceKey
);
protected static String* GetMessageFromResource (
    int win32ErrorCode,
    String* resourceKey
);
```

*Parameters* int *win32ErrorCode*

String* *resourceKey*

*Remarks*

Static helper method that builds the message out of a resource string.

*Return Value*

None

*Exceptions*

Properties

None

PrintServerException

This is the exception class thrown from inside the PrintServer object.

Definition public class PrintServerException: PrintSystemException, ISerializable

Namespace: System.Printing.PrintSubsystem
Assembly: System.Printing

Header File: PrintSystemException.hpp

Events

None

Constructors

PrintServerException.PrintServerException

Creates a new instance of the PrintServerException class.

*Overload List* public PrintServerException ( void);

public PrintServerException (String*);

public PrintServerException (String*, Exception);

protected PrintServerException (SerializationInfo, StreamingContext);

*Definition*

```
public PrintServerException (
    void
);
public PrintServerException (
    String* message
);
```

```
public PrintServerException (
    String* message,
    Exception innerException
);
protected PrintServerException (
    SerializationInfo info,
    StreamingContext context
);
```

*Parameters*

String* *message*

Exception *innerException*

SerializationInfo *info*

StreamingContext *context*

*Remarks*

The message must be a string resource key.

Default message: Print System exception.

*Return Value*

HResult: HRESULT_FROM_WIN32(PrinterHResult::PrintSystemGenericError)

*Exceptions* none

Methods

PrintServerException.GetObjectData Method

*Definition*

```
public override void GetObjectData (
    SerializationInfo info,
    StreamingContext context
);
```

*Parameters*

SerializationInfo *info*

StreamingContext *context*

*Remarks*

*Return Value*

None

*Exceptions*

Properties

PrintServerException.ServerName Property

Gets the name of the PrintServer object that was involved in the operation that threw the exception. CAS to be checked.

*Definition* public String* ServerName { get; }

*Property Value*

This property is read-only.

*Exceptions*

None

*Applies To*

None

PrintQueueException

This is the exception class thrown from inside the PrintQueue object.

Definition public class PrintQueueException: PrintSystemException, ISerializable

Namespace: System.Printing.PrintSubsystem
Assembly: System.Printing

Header File: PrintSystemException.hpp

Events

None

Constructors

PrintQueueException.PrintQueueException

Creates a new instance of the PrintQueueException class.

*Overload List* public PrintQueueException ( void);

public PrintQueueException (String*);

public PrintQueueException (String*, Exception);

protected PrintQueueException (SerializationInfo, StreamingContext);

*Definition*

```
public PrintQueueException (
    void
);
public PrintQueueException (
    String* message
);
public PrintQueueException (
    String* message,
    Exception innerException
);
protected PrintQueueException (
    SerializationInfo info,
    StreamingContext context
);
```

*Parameters*

String* *message*

Exception *innerException*

SerializationInfo *info*

StreamingContext *context*

*Remarks*

The message must be a string resource key.

Default message: Print System exception.

*Return Value*

HResult: HRESULT_FROM_WIN32(PrinterHResult::PrintSystemGenericError)

*Exceptions* none

Methods

PrintQueueException.GetObjectData Method

*Definition*

```
public override void GetObjectData (
    SerializationInfo info,
    StreamingContext context
);
```

*Parameters*

SerializationInfo *info*

StreamingContext *context*

*Remarks*

*Return Value*

None

*Exceptions*

Properties

PrintQueueException.PrinterName Property

Gets the name of the PrintQueue object that was involved in the operation that threw the exception. CAS to be checked.

*Definition*

```
public String* PrinterName { get; }
```

*Property Value*

This property is read-only.

*Exceptions*

None

*Applies To*

None

PrintQueueStreamException

This is the exception class thrown from inside the PrintQueueStream object.

Definition public class PrintQueueStreamException: PrintSystemException, ISerializable

Namespace: System.Printing.PrintSubsystem
Assembly: System.Printing

Header File: PrintSystemException.hpp

Events

None

Constructors

PrintQueueStreamException.PrintQueueStreamException

Creates a new instance of the PrintQueueStreamException class.

*Overload List* public PrintQueueStreamException ( void);

public PrintQueueStreamException (String*);

public PrintQueueStreamException (String*, Exception);

protected PrintQueueStreamException (SerializationInfo, StreamingContext);

*Definition*

```
public PrintQueueStreamException (
    void
);
public PrintQueueStreamException (
    String* message
);
public PrintQueueStreamException (
    String* message,
    Exception innerException
);
protected PrintQueueStreamException (
    SerializationInfo info,
    StreamingContext context
);
```

*Parameters*

String* *message*

Exception *innerException*

SerializationInfo *info*

StreamingContext *context*

*Remarks*

The message must be a string resource key.

Default message: Print System exception.

*Return Value*

HResult: HRESULT_FROM_WIN32(PrinterHResult::PrintSystemGenericError)

*Exceptions*

None

Methods

PrintQueueStreamException.GetObjectData Method

*Definition*

```
public override void GetObjectData (
    SerializationInfo info,
    StreamingContext context
);
```

*Parameters*

SerializationInfo *info*

StreamingContext *context*

*Remarks*

*Return Value*

None

*Exceptions*

None

Properties

PrintQueueStreamException.NumberOfWrittenBytes

Gets the name of the number of bytes written to the Spooler

*Definition*

```
public Int32 NumberOfWrittenBytes { get; }
```

*Property Value*

This property is read-only

*Exceptions*

None

*Applies To*

None

PrintJobException

This is the exception class thrown by methods of PrintSystemJob, and PrintSystemJobInfo classes.

Definition public class PrintJobException: PrintSystemException, ISerializable

Namespace: System.Printing.PrintSubsystem
Assembly: System.Printing

Header File: PrintSystemException.hpp

Events

None

Constructors

PrintJobException.PrintJobException

Creates a new instance of the PrintJobException class.

*Overload List* public PrintJobException ( void);

public PrintJobException (String*);

public PrintJobException (String*, Exception);

protected PrintJobException (SerializationInfo, StreamingContext);

*Definition*

```
public PrintJobException (
    void
);
public PrintJobException (
    String* message
);
public PrintJobException (
    String* message,
    Exception innerException
);
```

```
protected PrintJobException (
    SerializationInfo info,
    StreamingContext context
);
```

*Parameters*

String* *message*

Exception *innerException*

SerializationInfo *info*

StreamingContext *context*

*Remarks*

The message must be a string resource key.

Default message: Print System exception.

*Return Value*

HResult: HRESULT_FROM_WIN32(PrinterHResult::PrintSystemGenericError)

*Exceptions*

Methods

PrintJobException.GetObjectData Method

*Definition*

```
public override void GetObjectData (
    SerializationInfo info,
    StreamingContext context
);
```

*Parameters*

SerializationInfo *info*

StreamingContext *context*

*Remarks*

*Return Value*

None

*Exceptions*

None

Properties

PrintJobException.NumberOfWrittenBytes

Gets the name of the number of bytes written to the Spooler

*Definition* public String* NumberOfWrittenBytes { get; }

*Property Value*

This property is read-only

*Exceptions*

None

*Applies To*

None

PrintCommitAttributesException

This exception class is thrown from inside the Commit methods of the PrintQueue and PrintServer indicating that not all the required properties were committed and it has methods to discover the reason for the problem.

Definition public class PrintCommitAttributesException: PrintSystemException, ISerializable

Namespace: System.Printing.PrintSubsystem
Assembly: System.Printing

Header File: PrintSystemException.hpp

Events

None

Constructors

PrintCommitAttributesException.PrintCommitAttributesException

Creates a new instance of the PrintSystemException class.

*Overload List* public PrintCommitAttributesException ( void);

public PrintCommitAttributesException (String*);

public PrintCommitAttributesException (String*, Exception);

protected PrintCommitAttributesException (SerializationInfo, StreamingContext);

*Definition* public PrintCommitAttributesException (
void
);
public PrintCommitAttributesException (
String* *message*
);
public PrintCommitAttributesException (
String* *message*,
Exception *innerException*
);
protected PrintCommitAttributesException (
SerializationInfo *info*,
StreamingContext *context*
);

*Parameters*

String* *message*

Exception *innerException*

SerializationInfo *info*

StreamingContext *context*

*Remarks*

The message must be a String* resource key.

Default message: An exception occurred while committing the print queue properties.

*Return Value*

HResult: HRESULT_FROM_WIN32(PrinterHResult::PrintSystemGenericError)

*Exceptions*

Methods

PrintCommitAttributesException.GetObjectData Method

*Definition*

```
public override void GetObjectData (
    SerializationInfo* info,
    StreamingContext context
);
```

*Parameters*

SerializationInfo *info*

StreamingContext *context*

*Remarks*

*Return Value*

*Exceptions*

Properties

PrintCommitAttributesException.SucceedToCommitAttributes Property

List of strings representing the names of the properties that succeeded to commit.

*Definition*

```
public IList* SucceedToCommitAttributes { get; }
```

*Property Value*

This property is read-only.

*Exceptions*

None

*Applies To*

None

PrintCommitAttributesException.FailToCommitAttributes Property

List of strings representing the names of the properties that failed to commit.

*Definition* public IList* SucceedToCommitAttributes { get; }

*Property Value*

This property is read-only.

*Exceptions*

None

*Applies To*

None

PrintCommitAttributesException.PrintObjectName Property

Gets the name of the PrintServer object that was involved in the operation that threw the exception. CAS to be checked.

*Definition* public String* PrintObjectName { get; }

*Property Value*

This property is read-only.

*Exceptions*

None

*Applies To*

None

Print System Data Types

PrintQueueAttributes

This is a flag enumeration of the print queue attributes.

*Location*

PrinterDataTypes.hpp

*Definition*

__value public enum PrintQueueAttributes {}

*Values*

| Value Name | Description |
|---|---|
| **Uninitialized** | |
| **Queued** | If set, the printer spools and starts printing after the last page is spooled. |
| **Direct** | Job is sent directly to the printer. |
| **Shared** | Indicates whether the printer is published in the directory service. |
| **Hidden** | Reserved. |
| **EnableDevQ** | If set, DevQueryPrint is called. |
| **KeepPrintedJobs** | If set, jobs are kept after they are printed. If unset, jobs are deleted. |
| **DoCompleteFirst** | If set and printer is set for print-while-spooling, any jobs that have completed spooling are scheduled to print before jobs that have not completed spooling. |
| **EnableBidi** | Indicates whether bi-directional communications are enabled for the printer. |
| **RawOnly** | Indicates that only raw data type print jobs can be spooled. |
| **Published** | Indicates whether the printer is published in the directory service. |
| **DualHeaded** | Indicated whether the printer supports permium printing or not. |

PrintQueueStatus

This is a flag enumeration of the print queue status.

*Location*

PrinterDataTypes.hpp

*Definition*

__value public enum PrintQueueStatus {}

Values

| Value Name | Description |
|---|---|
| **Uninitialized** | Print Queue is in uninitialized state. |
| **Paused** | The printer is paused. |
| **Error** | The printer is in an error state. |
| **PendingDeletion** | The printer is being deleted. |
| **PaperJam** | Paper is jammed in the printer |
| **PaperOut** | The printer is out of paper. |
| **ManualFeed** | The printer is in a manual feed state. |
| **PaperProblem** | The printer has a paper problem. |
| **Offline** | The printer is offline. |
| **IOActive** | The printer is in an active input/output state. |
| **Busy** | The printer is busy. |
| **Printing** | The printer is printing. |
| **OutputBinFull** | The printer's output bin is full. |
| **NotAvailable** | The printer is not available for printing. |
| **Waiting** | The printer is waiting. |
| **Processing** | The printer is processing a print job. |
| **Initializing** | The printer is initializing. |
| **WarmingUp** | The printer is warming up |

| | |
|---|---|
| **TonerLow** | The printer is low on toner. |
| **NoToner** | The printer is out of toner. |
| **PagePunt** | The printer cannot print the current page. |
| **UserIntervention** | The printer has an error that requires the user to do something. |
| **OutOfMemory** | The printer has run out of memory. |
| **DoorOpen** | The printer door is open. |
| **ServerUnknown** | The printer status is unknown. |
| **PowerSave** | The printer is in power save mode. |

EnumeratedPrintQueuesType

This is the enumeration of the attributes that can be used when enumerating PrintQueue objects on a PrintServer

*Location*

PrinterDataTypes.hpp

*Definition*

__value public enum EnumeratedPrintQueuesType {}

*Values*

| Value Name | Description |
|---|---|
| **Local** | Enumerates local printers on the target server. |
| **Shared** | Enumerates shared printers. |
| **Connections** | Enumerates printer connections on the target server. |
| **TS** | Enumerates printers installed through TS redirection feature. |
| **Fax** | Enumerates fax queues. |
| **KeepPrintedJobs** | Enumerates print queues that keep the printed jobs in the queue after done printing. |
| **EnableBidi** | Enumerates print queues that enable bi-directional communication to the device. |
| **RawOnly** | Enumerates print queues that spool only raw data type print jobs. |

| | |
|---|---|
| **WorkOffline** | Enumerates print queues that work offline. |
| **PublishedInDS** | Enumerates print queues that are published in the directory service. |
| **DirectPrinting** | Enumerates print queues that send the jobs directly to the device, without doing spooling. |
| **Queued** | Enumerates print queues that spool and start printing after the last page is spooled |
| **PushedUserConnection** | Enumerates print queues that were installed via Push Printer Connections user policy. |
| **PushedMachineConnection** | Enumerates print queues that were installed via Push Printer Connections machine policy. |
| **AllowEMFPrinting** | Enumerates print queues that allow EMF printing. |
| **EnableDevQuery** | Enumerates print queues that enables DevQueryPrint calls. |

PrintServerEventLogging

This is the enumeration of the Print Spooler error events that are logged.

*Location*

PrinterDataTypes.hpp

*Definition*

__value public enum PrintServerEventLogging {}

*Values*

| Value Name | Description |
|---|---|
| **LogPrintingSuccessEvents** | The Print Spooler will log success events in the event log. |
| **LogPrintingErrorEvents** | The Print Spooler will log error events in the event log. |
| **LogPrintingWarningEvents** | The Print Spooler will log warning events in |

| | |
|---|---|
| | the event log. |
| **LogPrintingInformationEvents** | The Print Spooler will log informational events in the event log. |
| **LogAllPrintingEvents** | The Print Spooler will log all events in the event log. |

PrintJobStatus

*Location*

PrinterDataTypes.hpp

*Definition*

__value public enum PrintJobStatus{}

*Values*

| Value Name | Description |
|---|---|
| **Uninitialized** | Not given |
| **Paused** | Not given |
| **Error** | Not given |
| **Deleting** | Not given |
| **Spooling** | Not given |
| **Printing** | Not given |
| **OffLine** | Not given |
| **PapreOut** | Not given |
| **Printed** | Not given |
| **Deleted** | Not given |
| **Blocked** | Not given |
| **UserIntervension** | Not given |
| **Restarted** | Not given |
| **Completed** | Not given |
| **Retained** | Not given |

PrintJobPriority

*Location*

PrinterDataTypes.hpp

*Definition*

__value public enum PrintJobPriority {}

*Values*

| Value Name | Description |
|---|---|
| Minimum | |
| Default | |
| Maximum | |

PrintQueueStringPropertyType

*Location*

PrintQueue.hpp

*Definition*

__value public enum PrintQueueStringPropertyType {}

*Values*

| Value Name | Description |
|---|---|
| Location | |
| Comment | |
| ShareName | |

PrintQueueStringProperty

*Location*

PrintQueue.hpp

*Definition*

__value public struct PrintQueueStringProperty {}

*Fields*

| Field Name | Description |
|---|---|
| PrintQueueStringPropertyType | |
| String* | |

PrintQueueProperty

*Location*

PrintQueue.hpp

*Definition*

__value public enum PrintQueueProperty {}

*Values*

| Value Name | Description |
|---|---|
| Name,<br>ShareName,<br>Comment,<br>Location,<br>Description,<br>Priority,<br>DefaultPriority,<br>StartTime,<br>UntilTime,<br>AveragePpm,<br>NumberOfJobs,<br>QueueAttributes,<br>QueueDriver,<br>QueuePort,<br>QueuePrintProcessor,<br>HostingPrintServer,<br>QueueStatus,<br>SepFile,<br>UserJobTicket,<br>DefaultJobTicket | |

PrintServerProperty

*Location*

PrintServer.hpp

*Definition*

__value public enum PrintServerProperty {}

*Values*

| Value Name | Description |
|---|---|
| DefaultSpoolDirectory | |
| PortThreadPriority | |
| DefaultPortThreadPriority | |
| SchedulerPriority | |
| DefaultSchedulerPriority | |
| BeepEnabled | |
| NetPopUp | |
| EventLog | |
| MajorVersion | |
| MinorVersion | |
| RestartJobOnPoolTimeout | |

RestartJobOnPoolEnabled

PrintSystemDesiredAccess

*Location*

PrintSystemSecurity.hpp

*Definition*

__value public enum PrintSystemDesiredAccess{}

*Values*

| Value Name | Description |
|---|---|
| **AdministrateServer** | |
| **EnumerateServer** | |
| **UsePrinter** | |
| **AdministratePrinter** | |
| **PrinterFullAccess** | |

CONCLUSION

Although the description above uses language that is specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. An executable programming interface embodied on one or more computer readable storage media, comprising:

a first group of services related to managing print queues; and a second group of services related to managing extensible print server properties, the print server properties being defined both as properties of managed printing objects and as attribute-value pair objects that are associated with the managed printing objects through collection objects of the managed printing objects, the defining of the print server properties by attribute-value pair objects enabling the print server properties to be independent of a print server operating system, and the print server properties further being accessed through getters and setters of the managed printing objects for the properties and through the collection objects based on attribute names included in the attribute-value pair objects.

wherein the properties of the managed printing objects and the attribute-value pair objects are linked such that an update made to one of the managed printing objects and the attribute-value pair objects is reflected with the other of the managed printing objects and the attribute-value pair objects.

2. A programming interface as recited in claim 1 wherein the programming interface is an object oriented programming interface.

3. A programming interface as recited in claim 1 wherein the print server properties are defined by name and type.

4. A programming interface as recited in claim 1 wherein the print server properties are extensible at run time.

5. A programming interface as recited in claim 1 wherein a plurality of print objects are extensible at run time.

6. A programming interface as recited in claim 1 further comprising a group of objects that represent a collection of print queues.

7. A programming interface as recited in claim 1 further comprising a group of objects that control access to the print server.

8. A programming interface as recited in claim 1 further comprising a group of objects that control access to at least one print queue.

9. A programming interface as recited in claim 1 wherein the first group of services includes a class of objects for installing and deleting print queues.

10. A printing interface embodied on one or more computer readable storage media, comprising:

a first group of objects to manage print jobs;

a second group of objects to configure a print server;

a third group of objects to control access to at least one printing component; and a fourth group of objects to manage extensible print server properties, the print server properties being defined both as properties of managed printing objects and as attribute-value pair objects that are associated with managed printing objects through collection objects of the managed printing objects, the defining of the print server properties by attribute-value pair objects enabling the print server properties to be independent of a print server operating system, and the print server properties further being accessed through getters and setters of the managed printing objects for the properties and through the collection objects based on attribute names included in the attribute-value pair objects.

wherein the properties of the managed printing objects and the attribute-value pair objects are linked such that an update made to one of the managed printing objects and the attribute-value pair objects is reflected with the other of the managed printing objects and the attribute-value pair objects.

11. A printing interface as recited in claim 10 wherein the first group of objects include at least one object to add print jobs to a print queue.

12. A printing interface as recited in claim 10 wherein the first group of objects include at least one object to delete print jobs from a print queue.

13. A printing interface as recited in claim 10 further comprising a fifth group of objects to manage at least one print queue.

14. A printing interface as recited in claim 10 further comprising a fifth group of objects that represent a collection of print queues.

15. A computer system including one or more processors and one or more software programs, the one or more software programs utilizing an application program interface to request printing services, the application program interface including separate commands to request services comprising:

a first group of services to configure a print server, wherein configuring the print server includes managing extensible print server properties, the print server properties being defined both as properties of managed printing objects and as attribute-value pair objects that are associated with managed printing objects through collection objects of the managed printing objects, the defining of the print server properties by attribute-value pair objects enabling the print server properties to be independent of a print server operating system, and the print server properties further being accessed through getters and setters of the managed printing objects for the properties and through the collection objects based on attribute names included in the attribute-value pair objects; and a second group of services to control access to at least one printing component coupled to the print server, wherein the properties of the managed printing objects and the attribute-value pair objects are linked such that an update made to one of the managed printing objects and the attribute-value pair objects is reflected with the other of the managed printing objects and the attribute-value pair objects.

16. A computer system as recited in claim 15 wherein the first group of services includes a class of objects for configuring the print server.

17. A computer system as recited in claim 15 wherein the second group of services includes a class of objects for accessing the at least one printing component.

18. A computer system as recited in claim 15 further comprising a third group of services to manage a plurality of print queues.

19. A computer system as recited in claim 15 further comprising a third group of services to control access to objects defined by a printing framework.

20. A method comprising:

managing a print server associated with a print queue by calling first functions from a programming interface, the managing including managing extensible print server properties, the print server properties being defined both as properties of managed printing objects and as attribute-value pair objects that are associated with managed printing objects through collection objects of the managed printing objects, the defining of the print server properties by attribute-value pair objects enabling the print server properties to be independent of a print server operating system, and the print server properties further being accessed through getters and setters of the managed printing objects for the properties and through the collection objects based on attribute names included in the attribute-value pair objects, wherein the properties of the managed printing objects and the attribute-value pair objects are linked such that an update made to one of the managed printing objects and the attribute-value pair objects is reflected with the other of the managed printing objects and the attribute-value pair objects; and calling at least one function from the programming interface to facilitate managing the print queue by calling second functions; or facilitate providing print jobs to the print queue by calling third functions.

21. A method as recited in claim 20 wherein the programming interface further comprises fourth functions to facilitate configuring at least one printing component.

22. A method as recited in claim 20 wherein the programming interface further comprises fourth functions to facilitate deleting print jobs from the print queue.

23. A method as recited in claim 20 wherein the programming interface further comprises fourth functions to facilitate controlling access to a printing component.

24. A method as recited in claim 20 wherein the second functions include a class of objects for adding print queues.

25. A method as recited in claim 20 wherein the second functions include a class of objects for deleting print queues.

* * * * *